US006539288B2

United States Patent
Ishida et al.

(10) Patent No.: US 6,539,288 B2
(45) Date of Patent: Mar. 25, 2003

(54) VEHICLE RENDERING DEVICE FOR GENERATING IMAGE FOR DRIVE ASSISTANCE

(75) Inventors: Akira Ishida, Sakai (JP); Atsushi Iisaka, Katano (JP); Takashi Yoshida, Ikoma (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/862,312

(22) Filed: May 23, 2001

(65) Prior Publication Data

US 2002/0002427 A1 Jan. 3, 2002

(30) Foreign Application Priority Data

May 24, 2000 (JP) ........................................ 2000-152381

(51) Int. Cl.$^7$ .............................. G05D 1/00; G06F 7/00
(52) U.S. Cl. .............................. 701/1; 701/27; 701/41; 382/104; 382/154; 340/932.2; 340/937; 340/461; 348/118; 348/119
(58) Field of Search ........................... 701/1, 41, 27; 180/204, 167, 401; 340/461, 932.2, 485, 436, 937; 348/115, 148, 118; 345/7, 9; 382/104, 106, 154, 199

(56) References Cited

U.S. PATENT DOCUMENTS

| 5,572,428 A | * | 11/1996 | Ishida et al. ................. 180/169 |
| 5,995,903 A | * | 11/1999 | Smith et al. ................. 340/995 |
| 6,222,447 B1 | * | 4/2001 | Schofield et al. ........... 340/435 |
| 6,285,778 B1 | * | 9/2001 | Nakajima et al. ........... 180/167 |
| 6,292,111 B1 | * | 9/2001 | Ishikawa et al. ........... 180/167 |
| 6,366,221 B1 | * | 4/2002 | Iisaka et al. ................ 180/204 |

FOREIGN PATENT DOCUMENTS

| JP | 64-14700 | 1/1989 |
| JP | 2000-67395 | 3/2000 |

* cited by examiner

Primary Examiner—Jacques H. Louis-Jacques
(74) Attorney, Agent, or Firm—Wenderoth, Lind & Ponack, L.L.P.

(57) ABSTRACT

In a rendering device, a processor receives surrounding images from image capture devices placed in a vehicle, and based thereon, generates a vehicle overlaid image. The processor also receives a rudder angle θ from a rudder angle sensor placed in the vehicle. Then, based on the received rudder angle θ, the processor calculates a 3D predictive trajectory of the vehicle, and on the vehicle overlaid image, renders the calculated 3D predictive trajectories thereby generating a display image. Therefore, the display image generated by the rendering device is driver-friendly.

26 Claims, 16 Drawing Sheets

F I G. 17
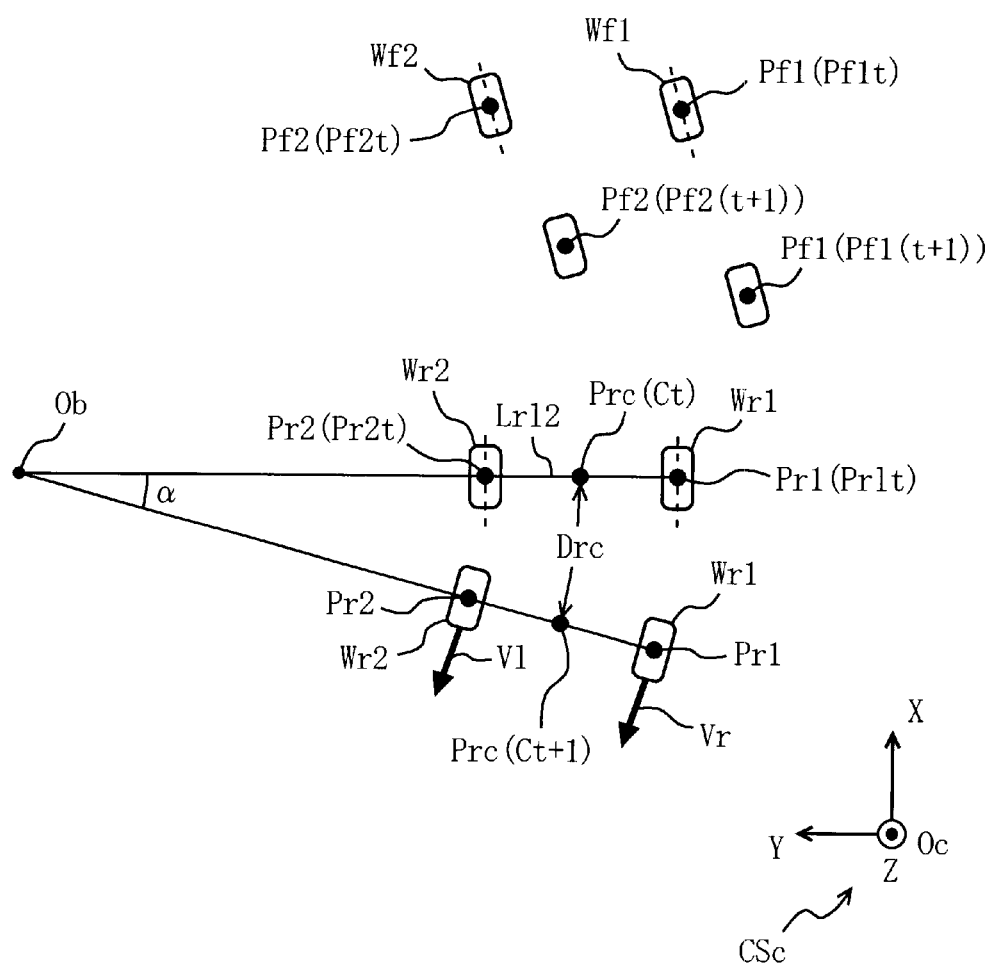

VEHICLE RENDERING DEVICE FOR GENERATING IMAGE FOR DRIVE ASSISTANCE

BACKGROUND OF THE INVENTION

1. Field of the Invention

The present invention relates to rendering devices and, more specifically, to a rendering device for processing images around a vehicle captured by image capture devices, and generating an image for display on a display device.

2. Description of the Background Art

Disclosed in Japanese Patent Laid-Open Publication No. 2000-67395 is a drive assistant device with a conventional rendering device incorporated therein. The drive assistant device is placed in a vehicle, and includes two wheel speed sensors, a computing unit, a graphic controller corresponding to the conventional rendering device, and a display. One of the wheel speed sensors takes charge of two wheels on the left side of the vehicle, and detects a travelling quantity thereof. As for the other wheel speed sensor, detected is a travelling quantity by two other wheels on the right side of the vehicle. Thus detected quantities are accumulated together by the computing unit, and based on the accumulated value, a radius of a circle traceable by the vehicle, when rotated, is estimated. Based on the estimated rotation radius, the graphic controller generates an image showing predictive trajectories on the road surface. The resulting image is displayed on the display.

Such a drive assistant device has two problems. First, a driver of the vehicle needs to be attentive, when parking, if any part of the vehicle with some height from the ground such as front and rear bumpers, mirrors, and fenders hits any object (e.g., other vehicles, wall) in a close range. However, the image generated by the graphic controller only shows predictive trajectories on the road surface. Therefore, with such an image on the display, the driver finds it difficult to determine if his/her bumper, and the like, is likely to hit any object therearound.

Second, when parallel parking, the driver may have a hard time to park his/her vehicle if the initial position thereof is not appropriate. If failed, the driver tries again all the way from the beginning. During that time, any information about trajectories so far tried but failed may help the driver not to try the same trajectories. However, displayed on the conventional drive assistant device are only the predictive trajectories on the road surface, the driver thus cannot learn from failure.

As such, due to those problems, the display image provided by the conventional drive assistant device is not driver-friendly enough.

SUMMARY OF THE INVENTION

Therefore, an object of the present invention is to provide a rendering device, a display image generated thereby being informative enough for the driver.

The present invention is directed to a rendering device for generating a display image for drive assistance, the device comprising: a first generation part for generating a surrounding image corresponding to an area surrounding the vehicle; a reception part for receiving a current rudder angle from a rudder angle sensor placed in the vehicle; a calculation part for calculating, based on the rudder angle received by the reception part, a three-dimensional predictive trajectory of the vehicle; and a second generation part for generating the display image showing the three-dimensional predictive trajectory calculated in the calculation part rendered on the surrounding image generated by the first generation part.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a diagram for demonstrating the processing in step S33 of FIG. 16.

DESCRIPTION OF THE PREFERRED EMBODIMENTS

Figure 1:
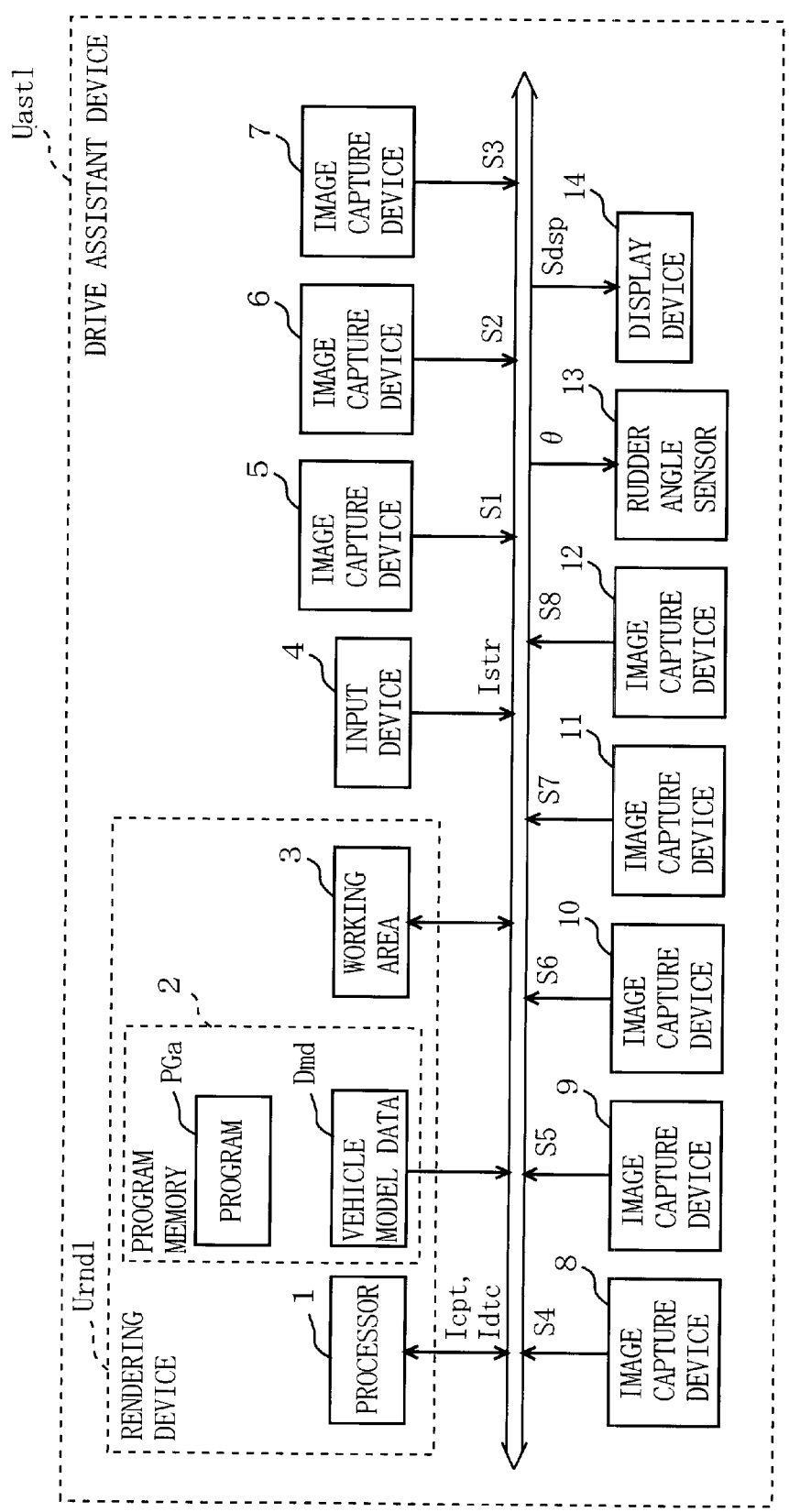
FIG. 1 is a block diagram showing the structure of a drive assistant device Uast1 incorporating a rendering device Urnd1 according to a first embodiment.

FIG. 1 is a block diagram showing the hardware structure of a rendering device Urnd1 according to a first embodiment of the present invention. In FIG. 1, the rendering device Urnd1 includes a processor 1, program memory 2, and a working area 3. The program memory 2 is typically ROM (Read Only Memory), and stores a program PGa for defining the processing procedure in the processor 1. The program memory 2 also stores vehicle model data Dmd, which will be described below.

Figure 2A:
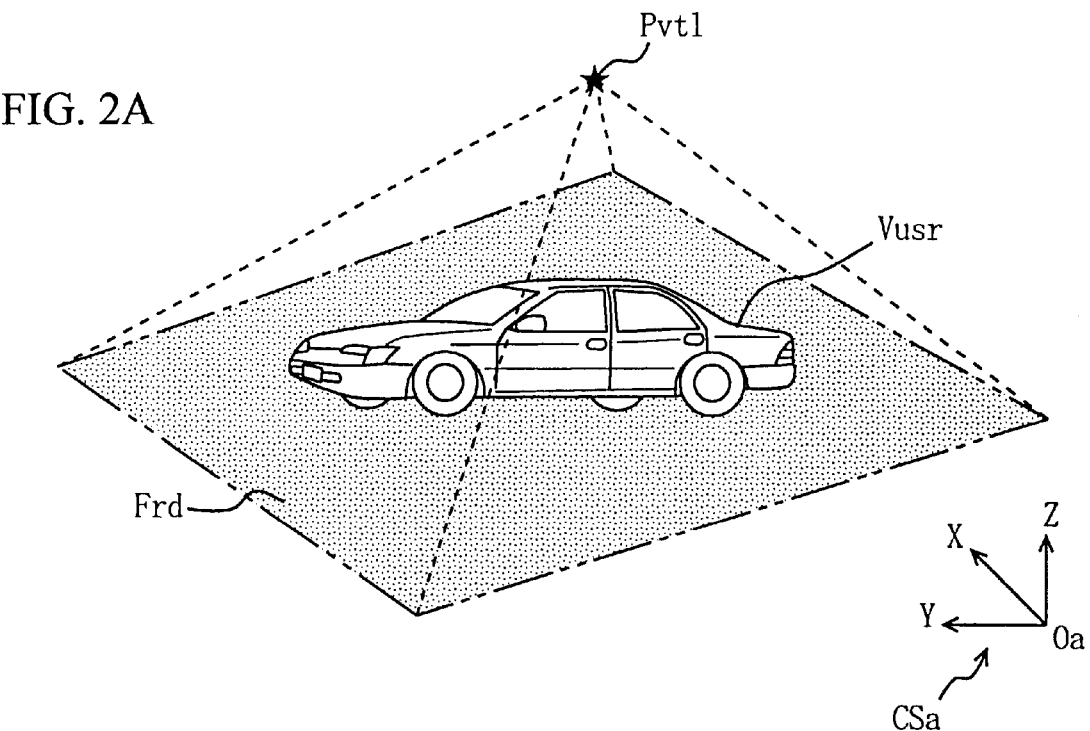
FIG. 2A is a slanted view of a vehicle Vusr standing still on a road surface Frd.
Figure 2B:
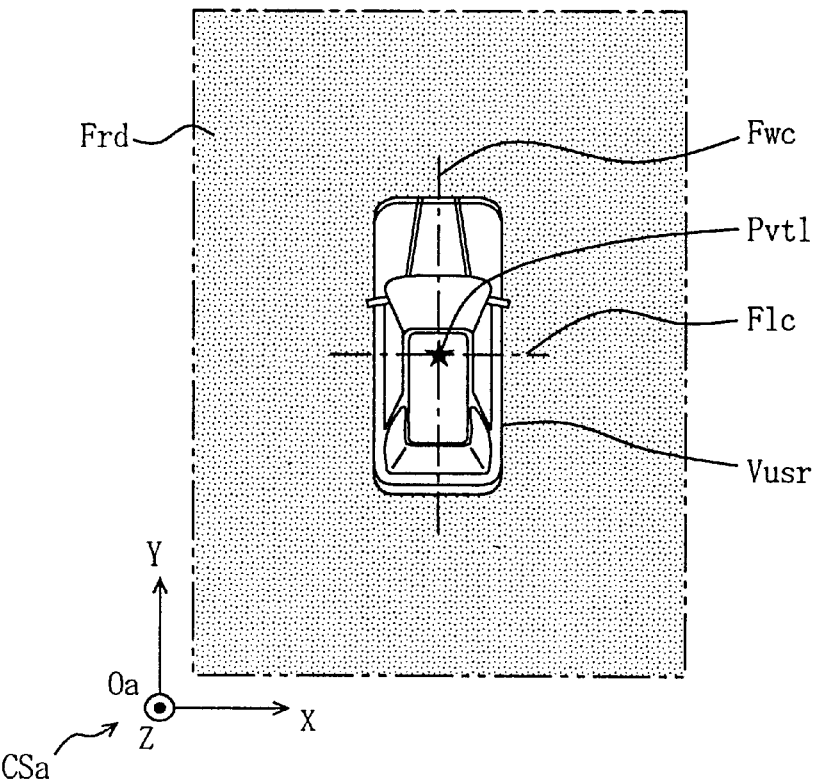
FIG. 2B is a diagram showing a top view of the vehicle Vusr of FIG. 2A.

FIGS. 2A and 2B are diagrams for demonstrating the vehicle model data Dmd. Specifically, FIG. 2A is a slanted view of a vehicle Vusr standing still on a road surface Frd, while FIG. 2B is a diagram showing the top view of the vehicle Vusr of FIG. 2A viewed from a virtual viewpoint Pvt1. In FIG. 2B, when the vehicle Vusr is in the straight-ahead position, a longitudinal plane passing through both a midpoint of a line between rotation centers of the front wheels, and another midpoint of a line between rotation centers of the rear wheels is referred to as a longitudinal median plane Fwc. The longitudinal median plane Fwc is rotated by 90 degrees around a vertical line passing through the center of the vehicle Vusr, and the resulting lateral plane is referred to as a lateral median plane Flc. These longitudinal median plane Fwc and lateral median plane Flc are indicated in FIG. 2B by a two-dot line and a one-dot line, respectively.

FIGS. 2A and 2B both show, a little away from the vehicle Vusr, a first 3D (three dimensional) coordinate system CSa including three axes of X, Y, and Z. For convenience, presumably, the Z-axis is equal to a line of intersection of the longitudinal median plane Fwc and the lateral median plane Flc. The X-axis is equal to a line of intersection of the lateral median plane Flc and the road surface Frd, while the Y-axis is equal to a line of intersection of the longitudinal median plane Fwc and the road surface Frd. Here, an origin Oa of the first 3D coordinate system Csa is a point of intersection of the road surface Frd, the longitudinal median plane Fwc, and the lateral median plane Flc. Further, the virtual viewpoint Pvt1 in FIGS. 2A and 2B is previously set high up above the vehicle Vusr, specifically 3D coordinates of which is (0, 0, zv).

Figure 3:
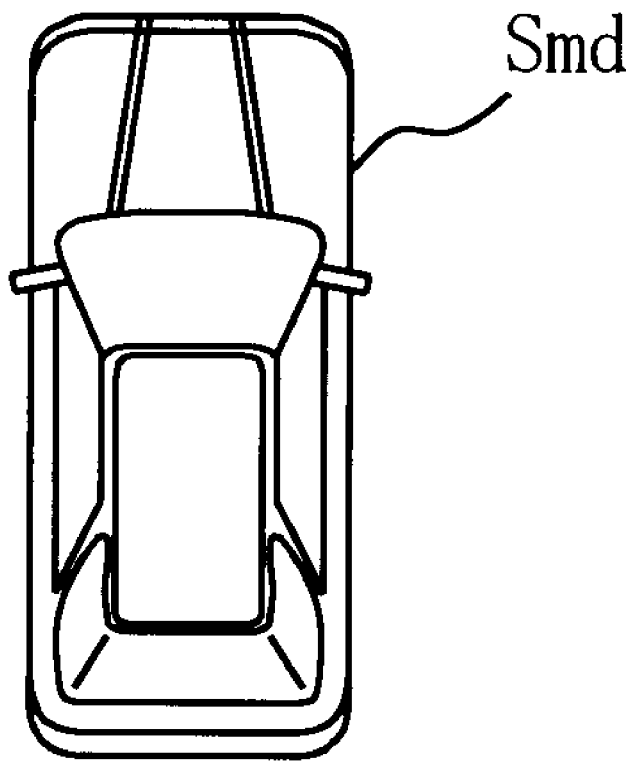
FIG. 3 is a diagram showing a vehicle model image Smd represented by vehicle model data Dmd shown in FIG. 1.

The vehicle model data Dmd represents, as shown in FIG. 3, a vehicle model image Smd. The vehicle model image Smd shows the vehicle Vusr on the road surface Frd viewed from the virtual viewpoint Pvt1, and reduced in size by a predetermined scaling factor Fscl.

In FIG. 1, the working area 3 is typically RAM (Random Access Memory), and used by the processor 1 when executing the program PGa. The rendering device Urnd1 in such structure is typically incorporated into the drive assistant device Uast1. The drive assistant device Uast1 is placed in the vehicle Vusr, and includes an input device 4, eight image capture devices 5 to 12, a rudder angle sensor 13, and a display device 14.

The input device 4 is, typically, operated by the driver when he/she parks the vehicle Vusr. In response, the input device 4 generates a start instruction signal Istr, and transmits the start instruction signal Istr to the processor 1. In the first embodiment, this start instruction signal Istr instructs the processor 1 to start executing the program PGa.

Figure 4A:
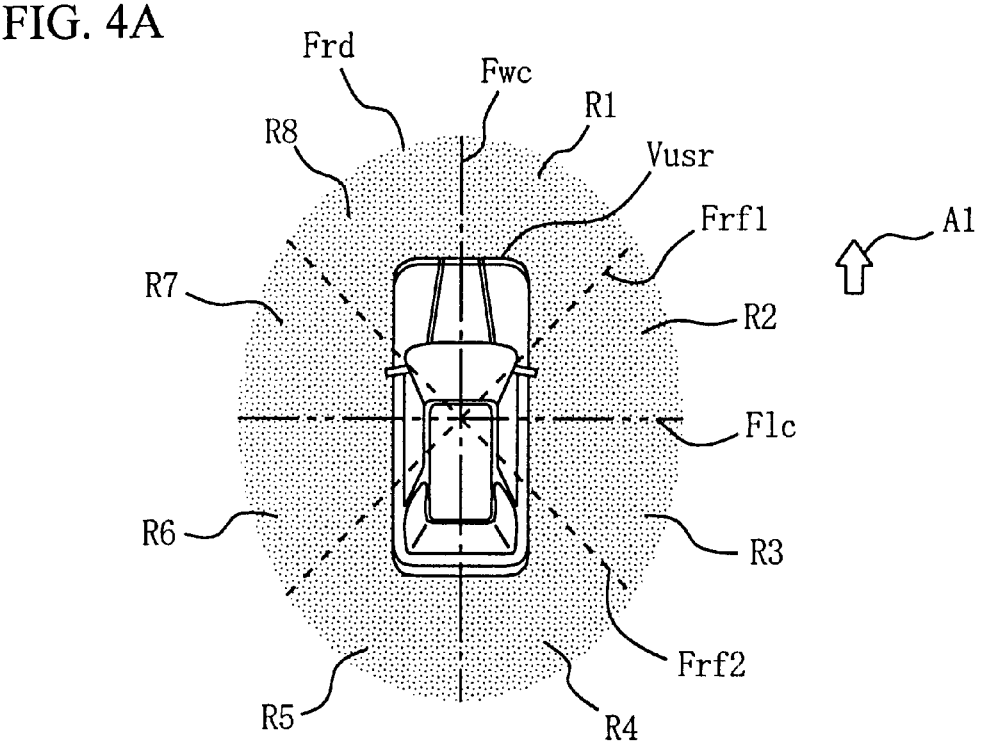
FIG. 4A is a diagram showing a manner of dividing an image surrounding the vehicle Vusr of FIGS. 2A and 2B.
Figure 4B:
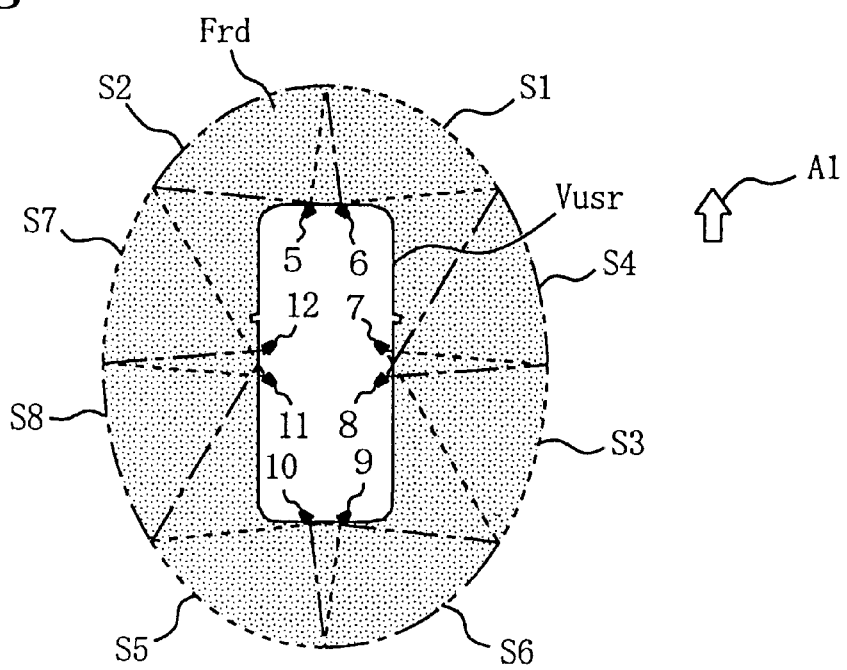
FIG. 4B is a diagram showing exemplary placement positions of image capture devices 5 to 12 shown in FIG. 1.

The image capture devices 5 to 12 are all placed in the vehicle Vusr, and their positions are exemplarily shown in FIGS. 4A and 4B. First, refer to FIG. 4A showing the top view of the vehicle Vusr standing still on the road surface Frd (dotted area). FIG. 4A shows four planes of the longitudinal median plane Fwc, the lateral median plane Flc, a first reference plane Frf1, and a second reference plane Frf2.

Here, the longitudinal and lateral median planes Fwc and Flc are both rotated by 45 degrees, as a rotation axis, with respect to a line of intersection thereof, and the resulting planes are the first and second reference planes Frf1 and Frf2. By these four planes, the area surrounding the vehicle Vusr is divided into eight regions R1 to R8.

As to those eight regions R1 to R8, the regions R1, R2, R7, and R8 are located on the front side of the vehicle Vusr, while the regions R3, R4, R5, and R6 on the rear side. Here, the front side denotes the front-half of the vehicle Vusr with reference to the lateral median plane Flc, and the rear side the rear-half. Herein, the heading direction of the vehicle Vusr is A1, which is denoted by an arrow in the drawing.

As shown in FIG. 4B, the image capture devices 5 and 6 are both fixedly placed at the front-end of the vehicle Vusr. In detail, the image capture device 5 captures an image corresponding to the region R1 of FIG. 4A as a surrounding image S1, which is enclosed by dotted lines in the drawing. In more detail, the first surrounding image S1 shows an area ahead of the vehicle Vusr on the right side, inclusive of the road surface Frd. The image capture device 6 is similarly in charge of the area ahead of the vehicle Vusr but on the left side, inclusive of the road surface Frd, and captures an image corresponding to the region R8. This captured image is referred to as a surrounding image S2, which is enclosed by one-dotted lines.

The image capture devices 7 and 8 are both fixedly placed on the right side of the vehicle Vusr with respect to the heading direction indicated by an arrow of A1, and take charge of an area on the right side of the vehicle Vusr. Specifically, the image capture device 7 is directed toward the rear-right side and takes charge of the area corresponding to the region R3, while the image capture device 8 is directed toward the front-right side and takes charge of the area corresponding to the region R2. The captured images are respectively referred to as surrounding images S3 and S4, both inclusive of the road surface Frd.

The image capture devices 9 and 10 are both fixedly placed at the rear-end of the vehicle Vusr. Specifically, the image capture device 9 takes charge of an area rear of the vehicle Vusr on the left side, inclusive of the road surface Frd, and captures an image corresponding to the region R5. This captured image is referred to as a surrounding image S5. The image capture device 10 is similarly in charge of the area rear of the vehicle Vusr but on the right side, inclusive of the road surface Frd, and captures an image corresponding to the region R4. This captured image is referred to as a surrounding image S6.

Further, the image capture devices 11 and 12 are both fixedly placed on the left side of the vehicle Vusr, and take charge of an area on the left side of the vehicle Vusr. Specifically, the image capture device 11 is directed toward the front-left side and takes charge of the area corresponding to the region R7, while the image capture device 12 is directed toward the rear-left side and takes charge of the area corresponding to the region R6. The captured images are respectively referred to as surrounding images S7 and S8, both inclusive of the road surface Frd.

Here, preferably, those surrounding images S1 to S8 do not limitedly correspond to the regions R1 to R8, but each extensively include its adjacent regions. For example, the surrounding image S1, which mainly corresponds to the region R1, partially includes the bordering area of each adjacent surrounding images S2 and S4.

In FIG. 1, the rudder angle sensor 13 detects a rudder angle θ of the steering wheel of the vehicle Vusr, and transmits the detected rudder angle θ to the processor 1. The rudder angle θ here indicates at what angle the steering wheel is turned with respect to the initial position. The steering wheel is considered in the initial position when not turned, that is, when the vehicle Vusr is in the straight-ahead position. The display device 14 is typically a liquid crystal display.

Figure 5:
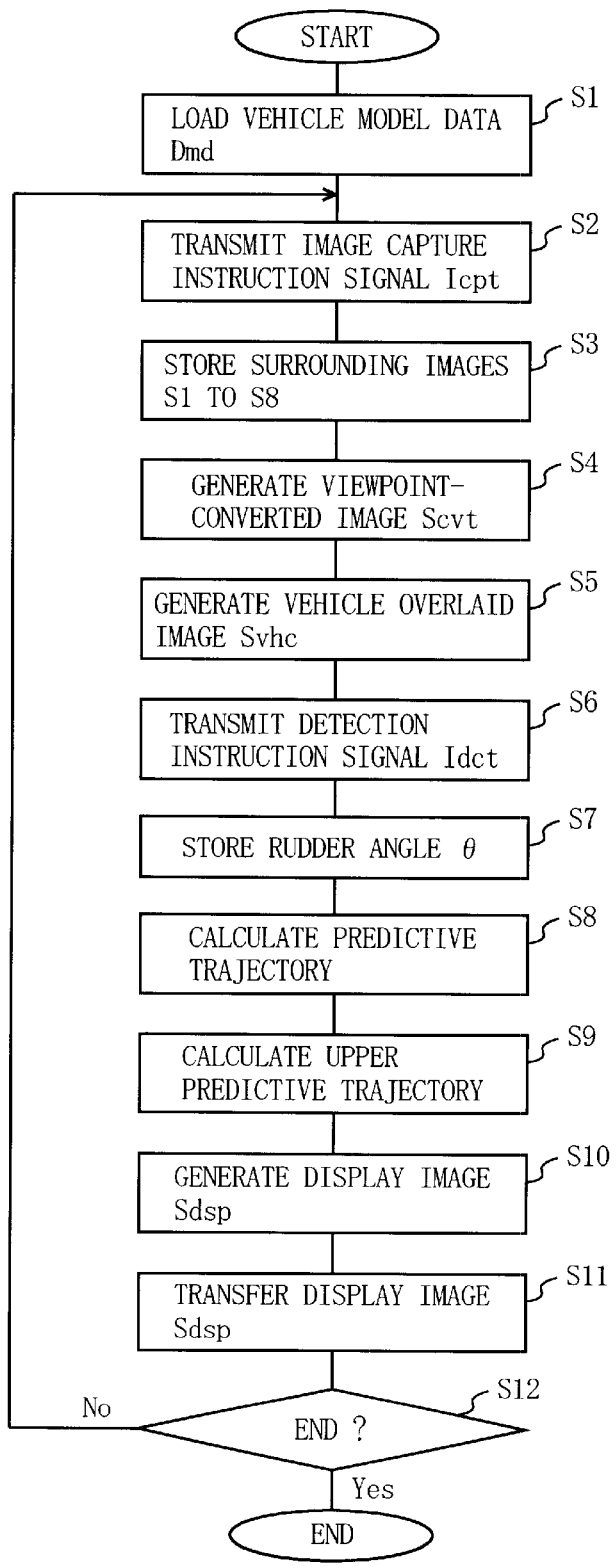
FIG. 5 is a flowchart showing a processing procedure described in a program PGa shown in FIG. 1.

Described next is the operation of such drive assistant device Uast1. When parking the vehicle Vusr, the driver operates the input device 4, which accordingly transmits a start instruction signal Istr to the processor 1. In response, the processor 1 starts executing the program PGa. Refer now to a flowchart of FIG. 5 for the processing procedure in the processor 1 described in the program PGa. In FIG. 5, the processor 1 first loads the vehicle model data Dmd from the program memory to the working area 3 (step S1).

The processor 1 then generates an image capture instruction signal Icpt, and transmits the image capture instruction signal Icpt to all of the image capture devices 5 to 12 (step S2) Here, the image capture instruction signal Icpt is the signal instructing the image capture devices 5 to 12 for image capturing. The image capture devices 5 to 12 accordingly capture the above described surrounding images S1 to S8, and store the surrounding images S1 to S8 in the working area 3 (step S3)

Next, the processor 1 subjects to image processing, those surrounding images S1 to S8 stored in step S3, and then generates a viewpoint-converted image Scvt on a frame memory reserved in the working area 3 (step S4). Here, as those surrounding images S1 to S8, the viewpoint-converted image Scvt covers the view around the vehicle Vusr. However, unlike in those surrounding images S1 to S8 captured by the fixedly-placed image capture devices 5 to 12, the view around the vehicle Vusr in the viewpoint-converted image Scvt is the one viewing the surroundings of the vehicle Vusr from the virtual viewpoint Pvt1 of FIG. 2. This is a rather conspicuous difference. After the image processing, the view in the resulting viewpoint-converted image Scvt is reduced in size by the scaling factor Fsc, which has been described in the foregoing with reference to FIG. 2. The processing in step S4 is a well-known technology, thus is not described here in detail.

Figure 6A:
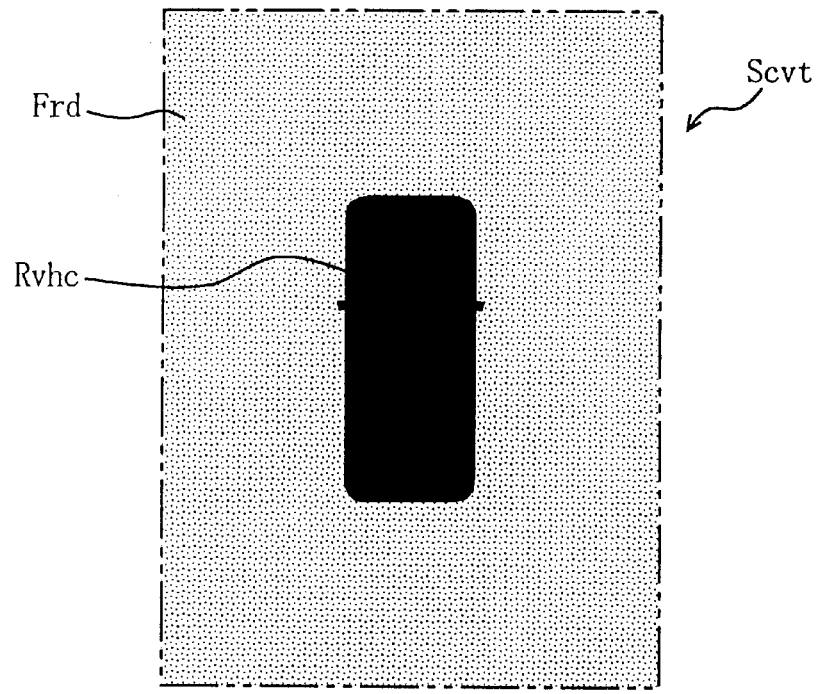
FIG. 6A is a diagram showing a viewpoint-converted image Scvt generated in step S4 of FIG. 5.
Figure 6B:
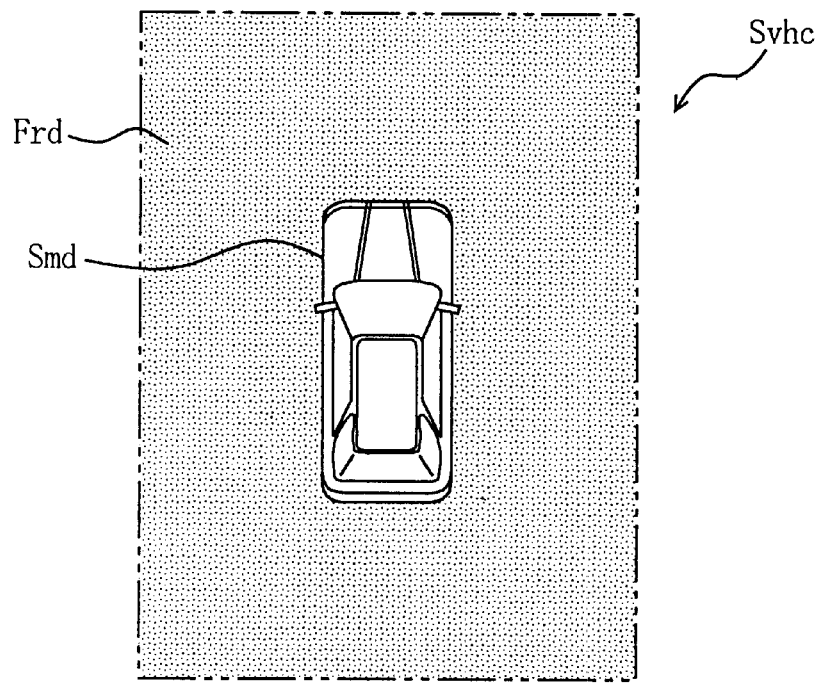
FIG. 6B is a diagram showing a vehicle overlaid image Svhc generated in step S5 of FIG. 5.

Here, due to the positions of the image capture devices 5 to 12, the surrounding images S1 to S8 hardly include the vehicle Vusr. Thus, as shown in FIG. 6A, the resulting viewpoint-converted image Scvt does not include the vehicle Vusr in a region Rvhc where the vehicle Vusr is supposed to appear. In the viewpoint-converted image Scvt, however, used are the same virtual viewpoint Pvt1 and scaling factor Fscl as for the vehicle model image Smd (see FIG. 3). Therefore, the shape of the region Rvhc coincides with that of the vehicle model image Smd. After step S4 is through, the processor 1 processes the vehicle model data Dmd on the working area 3. The vehicle model image Smd stored on the working area 3 is overlaid (placed) on the region Rvhc in the viewpoint-converted image Scvt (step S5). The resulting vehicle overlaid image Svhc is as shown in FIG. 6B.

The processor 1 then generates a detection instruction signal Idtc, and transmits the detection instruction signal Idtc to the rudder angle sensor 13 (step S6). With the detection instruction signal Idtc, the rudder angle sensor 13 is instructed to detect the rudder angle θ. The rudder angle sensor 13 then responsively detects the rudder angle θ, and stores the detected rudder angle θ in the working area 3 (step S7). Based on the detected rudder angle θ, the processor 1 calculates predictive trajectories Tr1 and Tr2 (step S8). In this embodiment, the predictive trajectories Tr1 and Tr2 indicate the predictive movement of the rear-right and rear-left wheels, respectively, of the vehicle Vusr on the 2D plane, i.e., the road surface Frd.

When parking, the vehicle is relatively slow in speed. Thus, presumably, the wheels of the vehicle Vusr do not skid on the road surface Frd. Under such presumption, Ackermann's model (two-wheel model) is popularly applied to calculate such 2D predictive trajectories (i.e., predictive trajectories on the road surface). By referring to FIG. 7, described in detail is a method of calculating such predictive trajectories on the road surface under the Ackermann's model.

Figure 7:
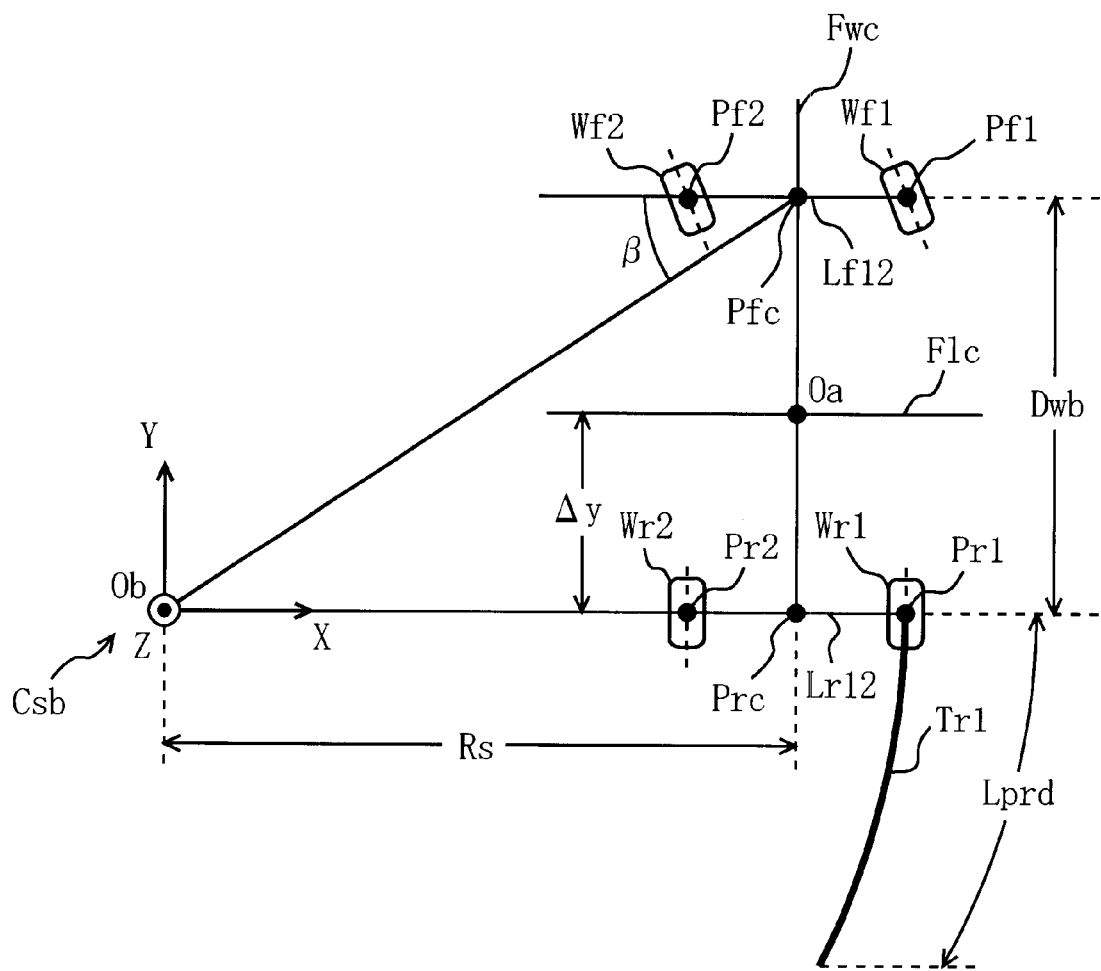
FIG. 7 is a diagram for demonstrating a method of calculating predictive trajectories in step S8 of FIG. 5.

FIG. 7 shows four wheels of the vehicle Vusr (not shown), that is, a front-right wheel Wf1, a front-left wheel Wf2, a rear-right wheel Wr1, and a rear-left wheel Wr2. Herein, the distance between a rotation center Pf1 of the front-right wheel Wf1 and a rotation center Pr1 of the rear-right wheel Wr1 is denoted by Dwb. That is, the distance Dwb is a wheel base of the vehicle Vusr, and is an eigenvalue and known quantity for the vehicle Vusr. FIG. 7 also shows line segments Lf12 and Lr12, the longitudinal median plane Fwc, and the lateral median plane Flc. The line segment Lf12 connects the rotation center Pf1 of the front-right wheel Wf1 and a rotation center Pf2 of the front-left wheel Wf2, while the line segment Lr12 connects the rotation center Pr1 of the rear-right wheel Wr1 and a rotation center Pr2 of the rear-left wheel Wr2. Those line segments Lf12 and Lr12 are both eigenvalues and known in length. In this embodiment, for convenience, those line segments Lf12 and Lr12 are presumably equal in length of Dr12.

FIG. 7 also shows, for convenience, a second 3D coordinate system CSb, including three axes of X, Y, and Z. If the driver turns the steering wheel without wheel skid, the vehicle Vusr circles around a point Ob which is observed on a line extended from the line segment Lr12. In this embodiment, the point Ob is the origin of the second 3D coordinate system CSb, and thus all of the axes of X, Y, and Z pass through the origin Ob. Here, the X-axis includes the line segment Lr12, the Y-axis is parallel to the longitudinal median plane Fwc, and the Z-axis is parallel to the vertical direction.

As to the circle traceable by the vehicle Vusr, the radius Rs is calculated by the following equation (1). Here, the radius Rs is the distance from the point Ob to a midpoint Prc of the line segment Lr12.

$$Rs = Dwb/\tan \beta \qquad (1)$$

Herein, the distance Dwb is a known value, and a steered angle β indicates at what angle the front wheels Wf1 and Wf2 are turned. The steered angle β is, as shown in FIG. 7, formed by a line connecting the point Ob and a midpoint Pfc of the line segment Lf12, and a ray connecting the midpoint Pfc and the rotation center Pf2.

Under the Ackermann's model, the steered angle β is presumably proportional to the rudder angle θ. Thus, with a proportionality constant (known quantity) being κ, the steered angle β is expressed by the following equation (2).

$$\beta = \kappa\theta \qquad (2)$$

With the equation (2), the above equation (1) can be converted as the following equation (3).

$$Rs = Dwb/\tan\kappa\theta \qquad (3)$$

In the second 3D coordinate system CSb, the X coordinate of the rotation center Pr1 of the rear-right wheel Wr1 is Rs+Dr12/2, while the Y coordinate thereof is 0. Thus, the circle traceable by the rear-right wheel Wr1, on the rotation center Pr1, around the origin Ob can be expressed by the following equation (4).

$$X^2 + Y^2 = (Rs + Dr12/2)^2 \qquad (4)$$

As to the circle expressed by the above equation (4) the predictive trajectory Tr1 is an arc in a predetermined length of Lprd starting from the rear-right wheel Wr1. In the above equation (4), as Rs is equal to Dwb/tan κθ, the rudder angle θ is the only unknown value. It means substituting the rudder angle θ stored in step S7 to the above equation (4) will find the predictive trajectory Tr1 of the rear-right wheel Wr1. Similarly, the circle traceable by the rear-left wheel Wr2, on the rotation center Pr2, around the origin Ob can be expressed by an equation, and thus the predictive trajectory Tr2 of the rear-left wheel Wr2 can be derived.

After step S8 is through, the processor 1 adds a height value hprd to the calculated predictive trajectories Tr1 and Tr2 so that predictive upper trajectories Tur1 and Tur2 are derived (step S9). Here, the height hprd is preferably positive, and equal to or smaller than the height of the vehicle Vusr. As a typical example, the predictive upper trajectory Tur1 is expressed by the following equation (5).

$$X^2 + Y^2 + (Z - hprd)^2 = (Rs + Dr12/2)^2 \qquad (5)$$

By the time when step S9 is through, the processor 1 produces a 3D predictive trajectory T3d of the vehicle Vusr. In this embodiment, the 3D predictive trajectory T3d is a region enclosed by the predictive trajectories Tr1 and Tr2, and the predictive upper trajectories Tur1 and Tur2, and three-dimensionally indicates how the vehicle Vusr moves on the road surface Frd from now on.

Next, the processor 1 overlays the calculated 3D predictive trajectory T3d onto the vehicle overlaid image Svhc on the frame memory (step S10). The resulting image is referred to as a display image Sdsp. In more detail, since the above equations (4) and (5) are derived based on the second 3D coordinate system CSb, those are derived this time based on the first 3D coordinate system CSa. As already described by referring to FIG. 2, the origin Oa of the first 3D coordinate system CSa is a point of intersection of the road surface Frd, the longitudinal median plane Fwc, and the lateral median plane Flc. Thus, as shown in FIG. 7, the origin Oa is away from the origin Ob of the second 3D coordinate system Csb by Rs in the X-axis direction and Δy in the Y-axis direction. Herein, Δy denotes a distance from the midpoint Prc to the lateral median plane Flc, and is an eigenvalue (i.e., known quantity) of the vehicle Vusr.

Figure 8:
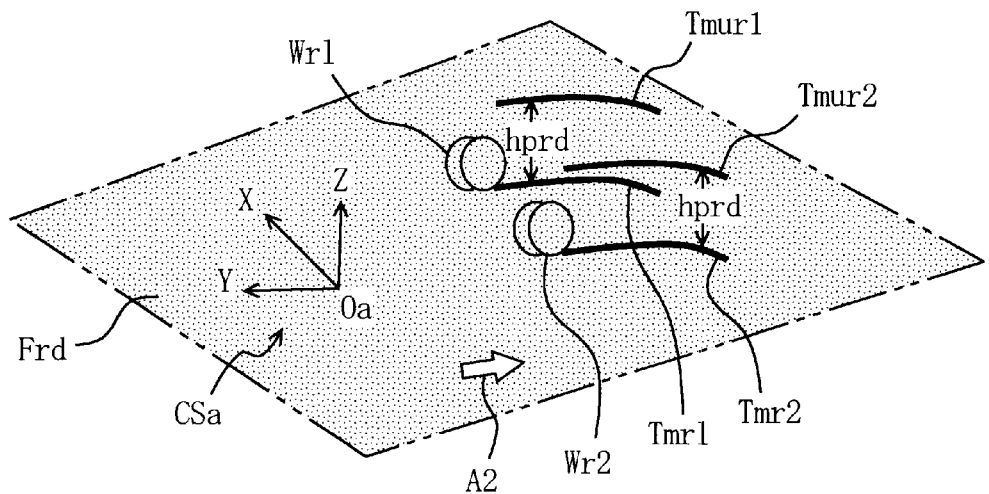
FIG. 8 is a diagram showing translated predictive upper trajectories Tmur1 and Tmur2 calculated in step S10 of FIG. 5.

For conversion to the first 3D coordinate system CSa, the processor 1 translates both the predictive trajectory Tr1 and the predictive upper trajectory Tur1 by Rs in the X-axis direction and Δy in the Y-axis direction. In the below, the predictive trajectory Tr1 and the predictive upper trajectory Tur1 after translation are respectively referred to as a translated predictive trajectory Tmr1 and a translated predictive upper trajectory Tmur1. The translated predictive trajectory Tmr1 is expressed by the following equation (6), and as shown in FIG. 8, extended in the direction of an arrow A2 from the rear-right wheel Wr1 as the vehicle Vusr (not shown) moves backward. The translated predictive upper trajectory Tmur1 is expressed by the following equation (7), and extended in the same direction as the translated predictive trajectory Tmr1 but away therefrom by the height hprd in the vertical direction.

$$(X - Rs)^2 + (Y - \Delta y)^2 = (Rs + Dr12/2)^2 \qquad (6)$$

$$(X - Rs)^2 + (Y - \Delta y)^2 + (Z - hprd)^2 = (Rs + Dr12/2)^2 \qquad (7)$$

In a similar manner, from the predictive trajectory Tr2 and the predictive upper trajectory Tur2, the processor 1 produces such translated predictive trajectory Tmr2 and translated predictive upper trajectory Tmur2 as shown in FIG. 8.

Figure 9:
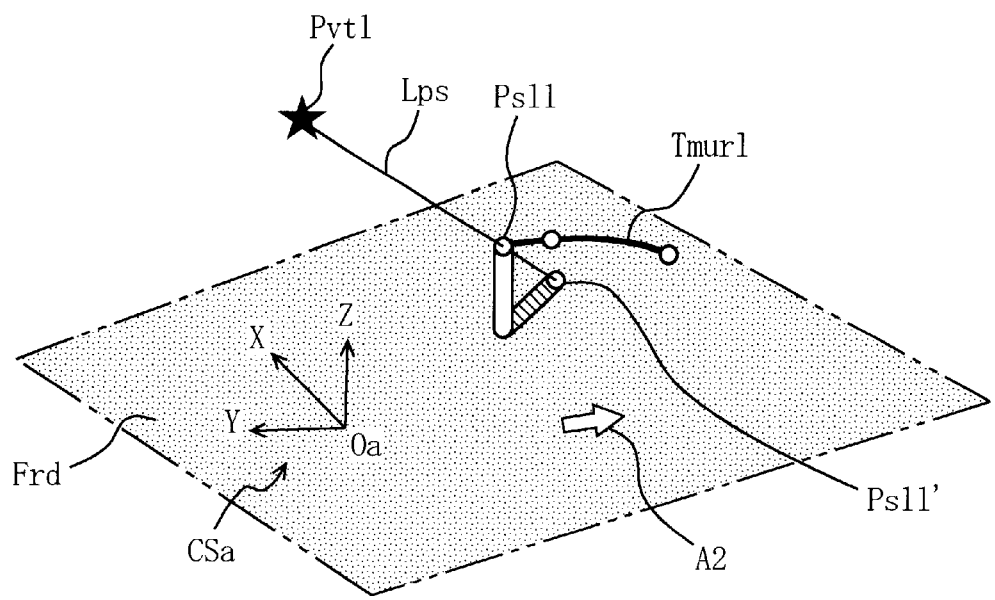
FIG. 9 is a diagram for demonstrating a method of calculating a rendered 3D predictive trajectory Tr3d in step S10 of FIG. 5.

Next, as shown in FIG. 9, the processor 1 samples n points (where n is a natural number being 2 or larger) from the translated predictive upper trajectory Tmur1 as sampling points Ps11 to Ps1n (FIG. 9 shows the sampling point Ps11 only). Preferably, the sampling points are so taken as to be regular in interval from/to adjacent sampling points Ps1i and Ps1 (i+1) where i is a natural number between 1 and (n−1). The processor 1 then projects the sampling points Ps11 to Ps1n on the road surface Frd (i.e., XY plane) from the virtual viewpoint Pvt1, and calculates 3D coordinates for each of projected sampling points Ps11' to Ps1n'. By referring to FIG. 9, described in detail is a method of calculating 3D coordinates for those projected sampling points Ps11' to Ps1n'.

As shown in FIG. 9, the projected sampling point Ps11' is a point of intersection of the XY plane (Z=0), and a straight line Lps between the virtual viewpoint Pvt1 and the sampling point Ps11. The directional vector N (n1, n2, n3) of the straight line Lps is expressed by the following equation (8).

$$(n1, n2, n3) = (Xs11/\Delta n, Ys11/\Delta n, (hprd - Zv)/\Delta n) \qquad (8)$$

Herein, Xs11, Ys11, and hprd are, respectively, the X coordinate, Y coordinate, and Z coordinate of the sampling point Ps11 in the first 3D coordinate system Csa, and all known values. Also, zv is the Z coordinate of the virtual viewpoint Pvt1, and Δn is expressed by the following equation (9).

$$\Delta n = \sqrt{\{Xs11^2 + Ys11^2 + (hprd - Zv)^2\}} \qquad (9)$$

Since the 3D coordinates of the virtual viewpoint Pvt1 is (0, 0, zv), the straight line Lps is expressed by the following equation (10).

$$(x, y, z) = (0, 0, zv) + t \cdot (n1, n2, n3) \qquad (10)$$

Herein, t is a variable.

Further, since the Z coordinate of the projected sampling point Ps11' is 0, the following equation (11) is substituted to the above equation (10).

$$z = 0 \qquad (11)$$

From the above equations (10) and (11), t can be expressed by the following equation (12).

$$t = -zv/n3 \qquad (12)$$

By substituting t expressed by the equation (12) to the equation (10), the 3D coordinates of the projected sampling point Ps11' is calculated as (−zv·n2/n3,−zv·n2/n3, 0). Here, as the values of n1 to n3 are all known, the projected sampling point Ps11' can be uniquely defined by 3D coordinates. Thereafter, the processor 1 calculates the 3D coordinates for each of the projected sampling points Ps12' to Ps1n' in the same manner. The processor 1 also samples n sampling points of Ps21 to Ps2n from the translated predictive upper trajectory Tmur2, and then calculates the 3D coordinates for each of projected sampling points Ps21' to Ps2n'.

Thereafter, for sampling, the processor 1 takes n sampling points of Psr11 to Psr1n from the predictive trajectory Tr1, and Psr21 to Psr2n on the predictive trajectory Tr2. Here, since the predictive trajectories Tr1 and Tr2 are originally on the road surface Frd, there is no need to calculate 3D coordinates for the sampling points thereon. With the above processing executed, the processor 1 produces a rendering 3D predictive trajectory Tr3d, which is the one obtained by projecting the 3D predictive trajectory T3d on the road surface Frd. To be more specific, the rendering 3D predictive trajectory Tr3d is a region enclosed by the projected sampling points Ps11' to Ps1n', Ps21' to Ps2n', and the sampling points Psr11 to Psr1n, and Psr21 to Psr2n.

Figure 10:
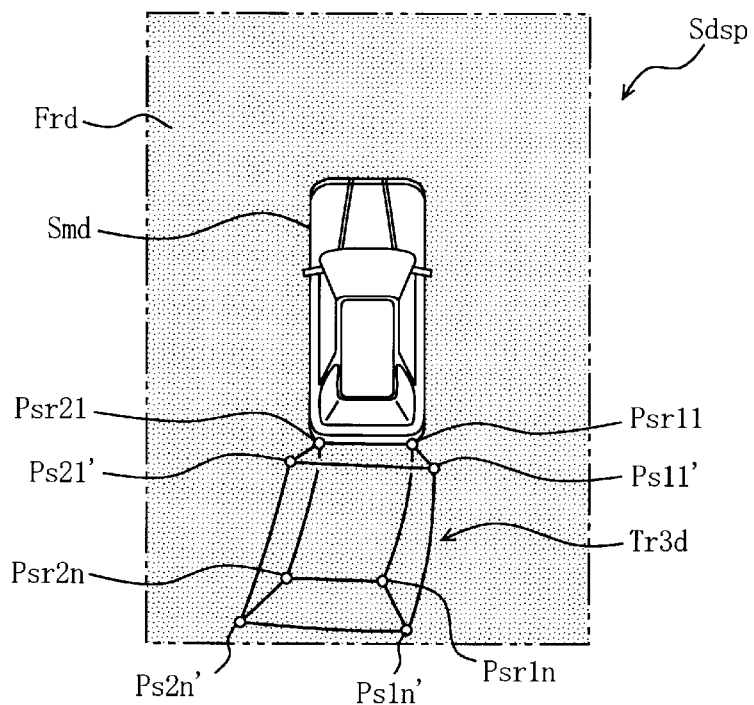
FIG. 10 is a diagram showing a display image Sdsp generated in step S10 of FIG. 5.

Next, the processor 1 renders the rendering 3D predictive trajectory Tr3d on the vehicle overlaid image Svhc on the frame memory, and generates such display image Sdsp as shown in FIG. 10 (step S10). More specifically, the processor 1 first selects, from among all of the sampling points found on the rendering 3D predictive trajectory Tr3d, the projected sampling points Ps1i' and Ps1 (i+1), Ps2i' and Ps2 (i+1), and the sampling points Psr1i and Psr1 (i+1), and Psr2i and Psr2 (i+1). With those selected sampling points, the processor 1 then renders a rectangular solid projected on the road surface Frd with the same scaling factor Fscl as above. The processor 1 then repeats the same processing until i changes from 1 to (n−1). As a result, the rendering 3D predictive trajectory Tr3d is successfully rendered on the vehicle overlaid image Svhc. Note herein that, for convenience, the rendering 3D predictive trajectory Tr3d in the drawing is extending from the rear wheels of the vehicle model image Smd. Actually, with hidden surface removal, the rendering 3D predictive image Tr3d in the display image Sdsp is so rendered as to extend from the rear end of the vehicle model image Smd.

The processor 1 then transfers the display image Sdsp on the frame memory to the display device 14 for display on its screen (step S11). With the display image Sdsp, the driver can check whether or not his/her current steering makes the vehicle Vusr fit into the parking space without hitting any object in a close range, or causing wheel stuck in a ditch. What is better, the display image Sdsp three-dimensionally shows the predictive trajectory of the vehicle Vusr. Therefore, the driver can also check whether or not the vehicle Vusr fits into the parking space without causing any part of the vehicle Vusr placed high up from the road surface Frd (e.g., fender) to hit any object.

Next, the processor 1 determines whether now is the time to end the processing of FIG. 5 (step S12). To see whether to end the processing, as one example, the processor 1 checks whether the engine of the vehicle Vusr has been stopped. If stopped, the processor 1 determines that the vehicle Vusr is now in the parking space, and thus ends the processing of FIG. 5. If not yet, the procedure returns to step S2 to generate another display image Sdsp.

In the present embodiment, the processor 1 calculates the rendering 3D predictive trajectory Tr3d based on the predictive trajectory Tr1 and the predictive upper trajectory Tur1 of the rear-right wheel Wr1 of the vehicle Vusr, and the predictive trajectory Tr2 and the predictive upper trajectory Tur2 of the rear-left wheel Wr2. This is not restrictive, and the predictive trajectories of the front-right and front-left wheels Wf1 and Wf2 may be based to calculate the rendering 3D predictive trajectory extending to the heading direction of the vehicle Vusr.

Figure 11:
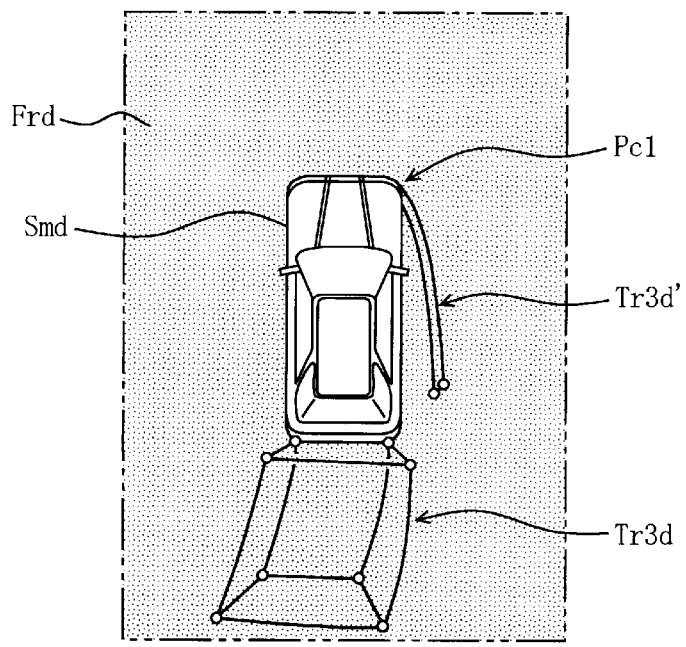
FIG. 11 is a diagram showing a rendering 3D predictive trajectory Tr3d'.

Further, when the steering wheel is now turned to the left, the processor 1 may render, in addition to the rendering 3D predictive trajectory Tr3d, another rendering 3D predictive trajectory Tr3d' as shown in FIG. 11. Here, the rendering 3D predictive trajectory Tr3d' is the one derived based on a predictive trajectory and a predictive upper trajectory for the upper-right part Pc1 of the vehicle Vusr. The direction to which the steering wheel is turned is determined by whether the rudder angle θ is positive or negative. On the whole, the processor 1 may detect to which direction the steering wheel is now turned based on whether the rudder angle θ is positive or negative, and with reference to the rear corner (the upper-right part Pc1) of the vehicle Vusr on the side opposite to the detected direction with respect to the heading direction, calculate the rendering 3D predictive trajectory Tr3d'.

For calculation of the rendering 3D predictive trajectory, alternatively based may be a predictive trajectory of a point taken on the surface of the vehicle Vusr farthest from the longitudinal median plane Fwc, and another predictive trajectory obtained by orthographic-parallel projecting the predictive trajectory of the point. Another possibility may be a predictive trajectory from the end of the front bumper (or rear bumper) of the vehicle Vusr, and other predictive trajectories obtained by orthographic-parallel projecting the predictive trajectories of the front bumper. As such, the processor 1 can calculate the rendering 3D predictive trajectory based on any arbitrary position in the space enclosed by the surface of the vehicle Vusr.

Still further, in the above embodiment, the processor 1 generates the viewpoint-converted image Scvt from the surrounding images S1 to S8, and thereonto, overlays the vehicle model image Smd and the rendering 3D predictive trajectory Tr3d. This is not restrictive, and the processor 1 may overlay the vehicle model image Smd and the rendering 3D predictive trajectory Tr3d onto the surrounding images S4 and S5 to generate the above display image Sdsp.

Still further, in the above, eight image capture devices 5 to 12 are fixedly placed in the vehicle Vusr. However, at least one image capture device will do as long as capturing a view image extending toward the rear of the vehicle Vusr.

Still further, in the above, although the vehicle Vusr is presumed to move backward for parking, the concept of the present embodiment is applicable if the vehicle Vusr is moved forward for parking.

Still further, in the above, the predictive trajectories Tr1 and Tr2 are both calculated based on the rudder angle θ. This is not restrictive, and as disclosed in Japanese Patent Laid-Open Publication No. 2000-67395, the wheel speed may be considered.

Figure 12:
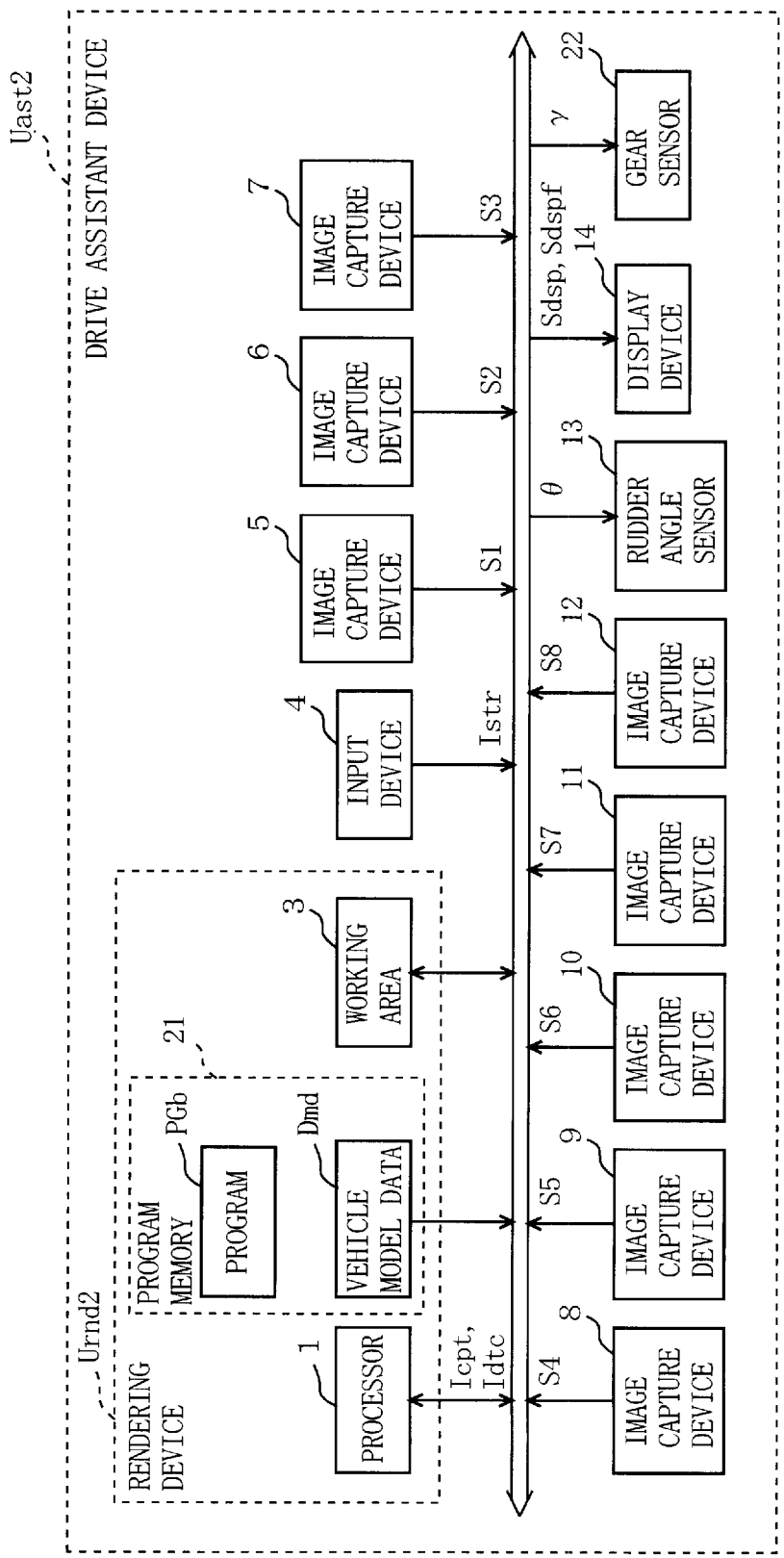
FIG. 12 is a block diagram showing the structure of a drive assistant device Uast2 incorporating a rendering device Urnd2, which is a modified example of the rendering device Urnd1 of FIG. 1.

Referring to FIG. 12, described next is another drive assistant device Uast2 incorporating a rendering device Urnd2, which is an exemplary modification of the rendering device Urnd1. In FIG. 12, compared with the rendering device Urnd1, the rendering device Urnd2 includes program memory 21 instead of the program memory 2. This is the only structural difference therebetween, and thus any component that appears in the rendering device Urnd1 is under the same reference numeral, and not described again.

The program memory 21 is typically ROM, and stores a program PGb for defining the processing procedure in the processor 1, and the vehicle model data Dmd described above with reference to FIG. 3.

In FIG. 12, the drive assistant device Uast2 is placed in the vehicle Vusr as is the drive assistant device Uast1. Compared with the drive assistant device Uast1, the drive assistant device Uast2 is additionally provided with a gear sensor 22, and the rendering device Urnd2 instead of the rendering device Urnd1. These are the only structural differences therebetween, and thus in the drive assistant device Uast2 in FIG. 12, any component that appears in the drive assistant device Uast1 is under the same reference numeral, and not described again.

When driving the vehicle Vusr carrying the drive assistant device Uast, the driver moves a gearshift to shift gears to an upper or lower. The gear sensor 22 detects in what gear the gearshift is, and the detected gear $\gamma$ is transmitted to the processor 1.

Figure 13:
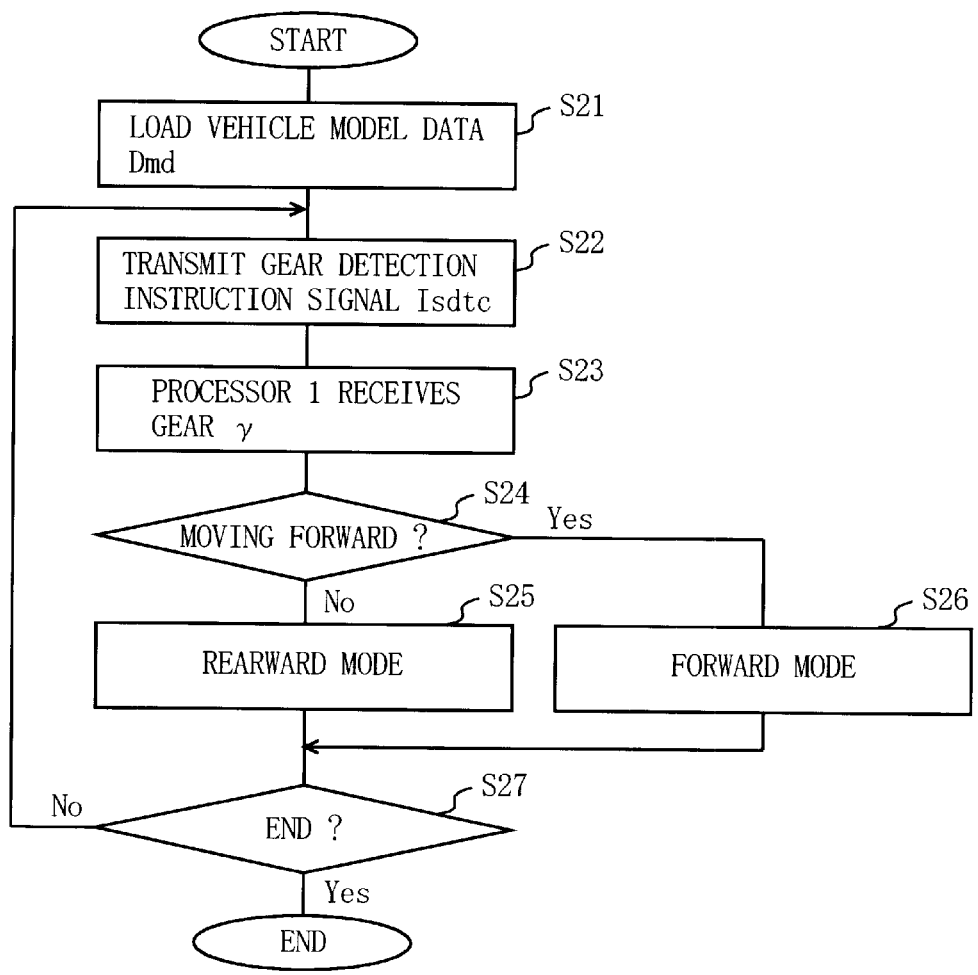
FIG. 13 is a flowchart showing a processing procedure described in a program PGb shown in FIG. 12.

Described next is the operation of the drive assistant device Uast2 in such structure. The input device 4 is, typically, operated by the driver when he/she parks the vehicle Vusr. In response, the input device 4 generates a start instruction signal Istr, and transmits the start instruction signal Istr to the processor 1. The processor 1 then responsively starts executing the program PGb. Refer now to a flowchart of FIG. 13 for the processing procedure in the processor 1 described in the program PGb. In FIG. 13, the processor 1 first reads the vehicle model data Dmd from the program memory 21 to the working area 3 (step S21).

Next, the processor 1 generates a gear detection instruction signal Isdtc, and transmits the gear detection instruction signal Isdtc to the gear sensor 22 (step S22). Here, the gear detection instruction signal Isdtc is a signal for instructing the gear sensor 22 to detect the gear $\gamma$. In response, the gear sensor 22 accordingly detects the gear $\gamma$, and transmits the detected gear $\gamma$ to the processor 1 (step S23). Based on the received gear $\gamma$, the processor 1 determines whether the vehicle Vusr is going to move forward or backward (step S24). In detail, when the received gear $\gamma$ indicates other than Neutral and Reverse, the processor 1 determines as the vehicle Vusr moving forward. When the received gear $\gamma$ indicates Reverse, the processor 1 determines as the vehicle Vusr is moving backward. Herein, although not relevant to the subject of the present invention, if the received gear $\gamma$ indicates Neutral, the procedure repeats step S22 again (not shown in FIG. 13).

When determined as the vehicle Vusr moving backward in step S24, the processor 1 executes a rearward mode (step S25). In the rearward mode, the processor 1 derives, as described in the first embodiment, the predictive trajectories indicating how the rear wheels of the vehicle Vusr will move on the road surface Frd, and the predictive upper trajectories with the height added thereto. Then, based on those predictive trajectories and predictive upper trajectories, the processor 1 generates such display image Sdsp as shown in FIG. 10. The display image Sdsp is then transferred to the display device 14 for display thereon.

Figure 14:
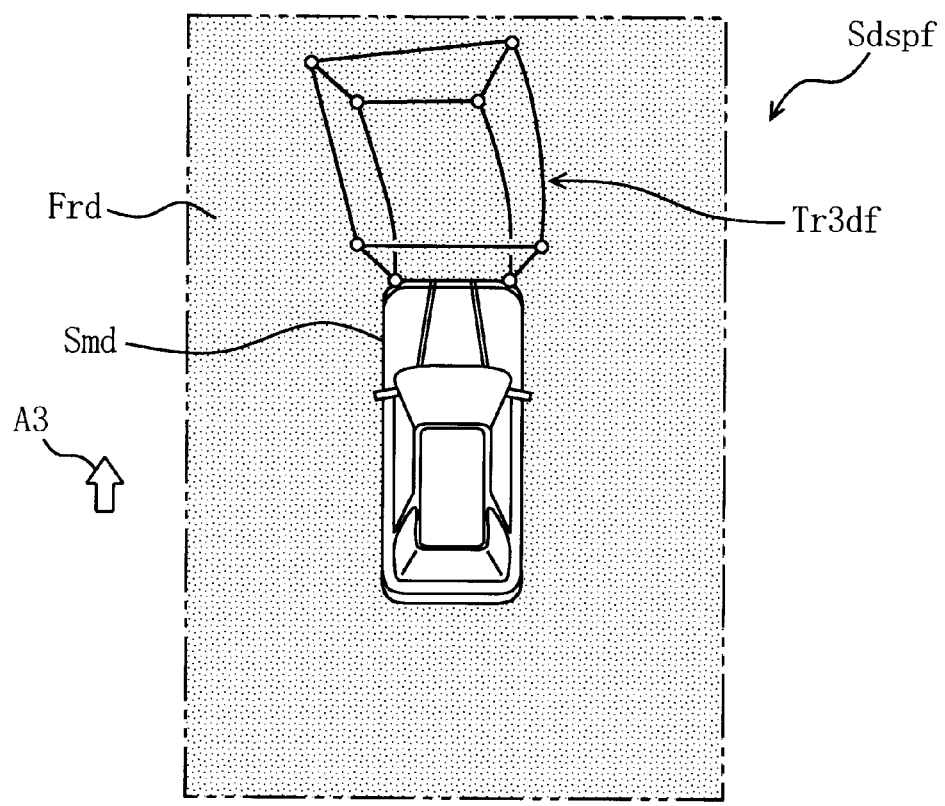
FIG. 14 is a diagram showing a display image Sdspf generated in step S26 of FIG. 13.

On the other hand, when determined as the vehicle Vusr moving forward in step S24, the processor 1 executes a forward mode (step S26). Unlike the rearward mode, the wheels trailed along in the forward mode for the predictive trajectories are the front wheels of the vehicle Vusr. This is rather a conspicuous difference. The processor 1 calculates the predictive trajectories indicating how the front wheels of the vehicle Vusr will move on the road surface Frd, and the predictive upper trajectories with the height added thereto. Then, based on those predictive trajectories and predictive upper trajectories, the processor 1 renders a rendering 3D predictive trajectory Tr3df, as shown in FIG. 14, and then generates a display image Sdspf. In the display image Sdspf in FIG. 14, the rendering 3D predictive trajectory Tr3df is so rendered on the road surface Frd as to extend from the front end of the vehicle model image Smd to the heading direction of an arrow A3. The display image Sdspf is transferred to the display device 14 for display thereon.

After step S25 or S26 is through, the processor 1 determines whether now is the time to end the processing of FIG. 13 with the method described in step S12 of FIG. 5 (step S27). If the processor 1 determines that the vehicle Vusr is now in the parking space, this is the end of the processing of FIG. 13. If determined not yet, the procedure returns to step S22 to repeat the same processing.

As such, according to the rendering device Urnd2 of the first modification, the processor 1 automatically determines whether the vehicle Vusr is now going to move forward or backward based on the gear $\gamma$ received from the gear sensor 22, and generates a display image meeting the driver's needs. Accordingly, the drive assistant device Uast2 is considered more driver-friendly than the drive assistant device Uast1.

Figure 15:
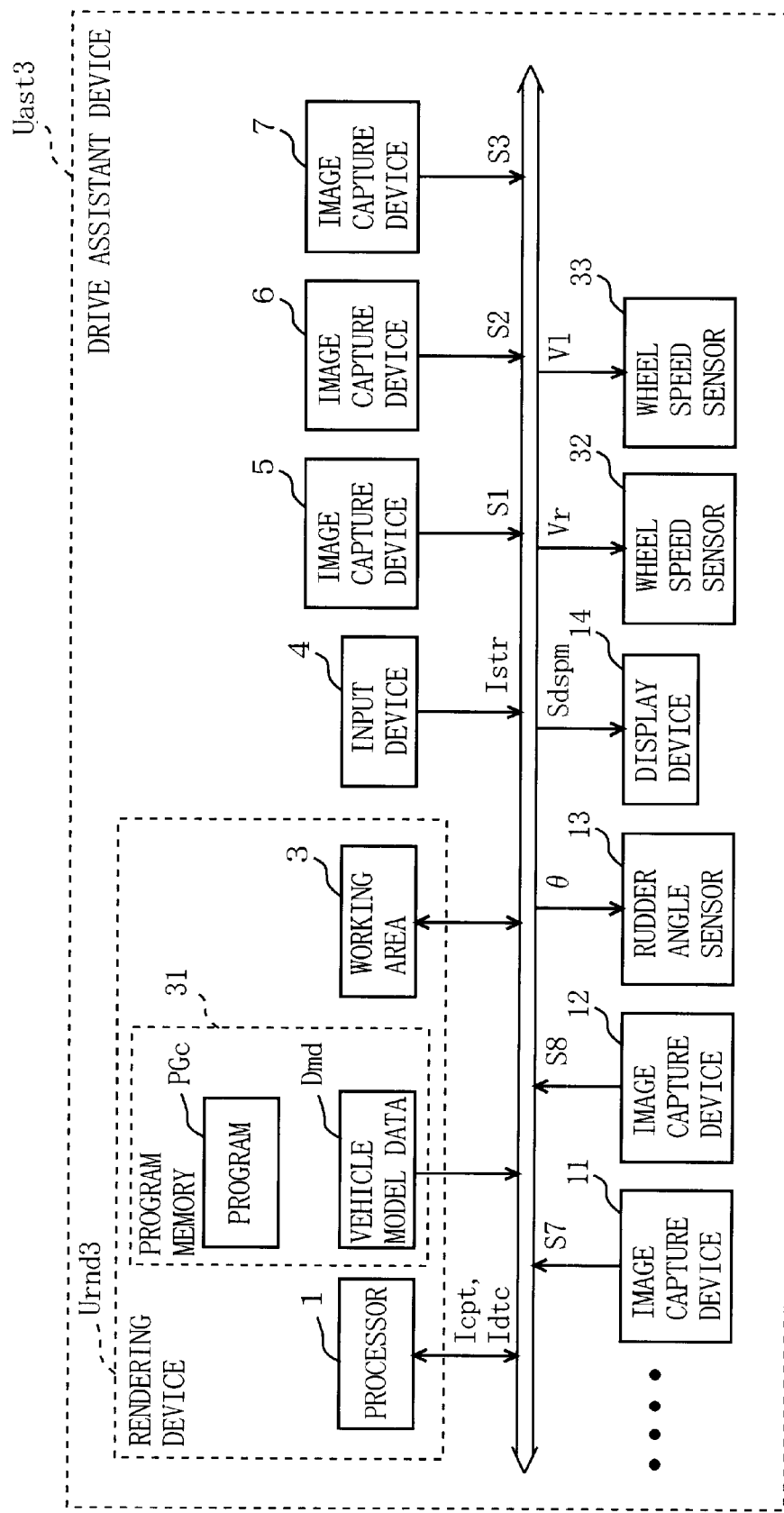
FIG. 15 is a block diagram showing the structure of a drive assistant device Uast3 incorporating a rendering device Urnd3 according to a second embodiment.

FIG. 15 is a block diagram showing the hardware structure of a rendering device Urnd3 according to a second embodiment of the present invention. In FIG. 15, compared with the rendering device Urnd1 of FIG. 1, the rendering device Urnd3 includes program memory 31 instead of the program memory 2. This is the only structural difference therebetween, and thus any component that appears in the rendering device Urnd1 is under the same reference numeral, and not described again.

The program memory 31 is typically a ROM, and stores a program PGc for defining the processing procedure in the processor 1, and the vehicle model data Dmd described above with reference to FIG. 3.

Further, in FIG. 15, the drive assistant device Uast3 is placed in the vehicle Vusr of FIG. 2 as is the drive assistant device Uast1. However, incorporated in the drive assistant device Uast3 is not the rendering device Urnd1 but the rendering device Urnd2, and at least two wheel speed sensors 32 and 33 are further provided therein. These are the only structural differences, and thus in the drive assistant device Uast3 in FIG. 15, any component that appears in the drive assistant device Uast1 is under the same reference numeral, and not described again. Here, FIG. 15 shows only four image capture devices 5, 6, 11, and 12 due to limited space, but the drive assistant device Uast3 actually carries 8 image capture devices 5 to 12 as the drive assistant device Uast1.

The wheel speed sensors 32 and 33 detect a wheel speed Vr of the rear-right wheel of the vehicle Vusr and a wheel speed Vl of the rear-left wheel, respectively, and transmit those wheel speeds Vr and Vl to the processor 1.

Figure 16:
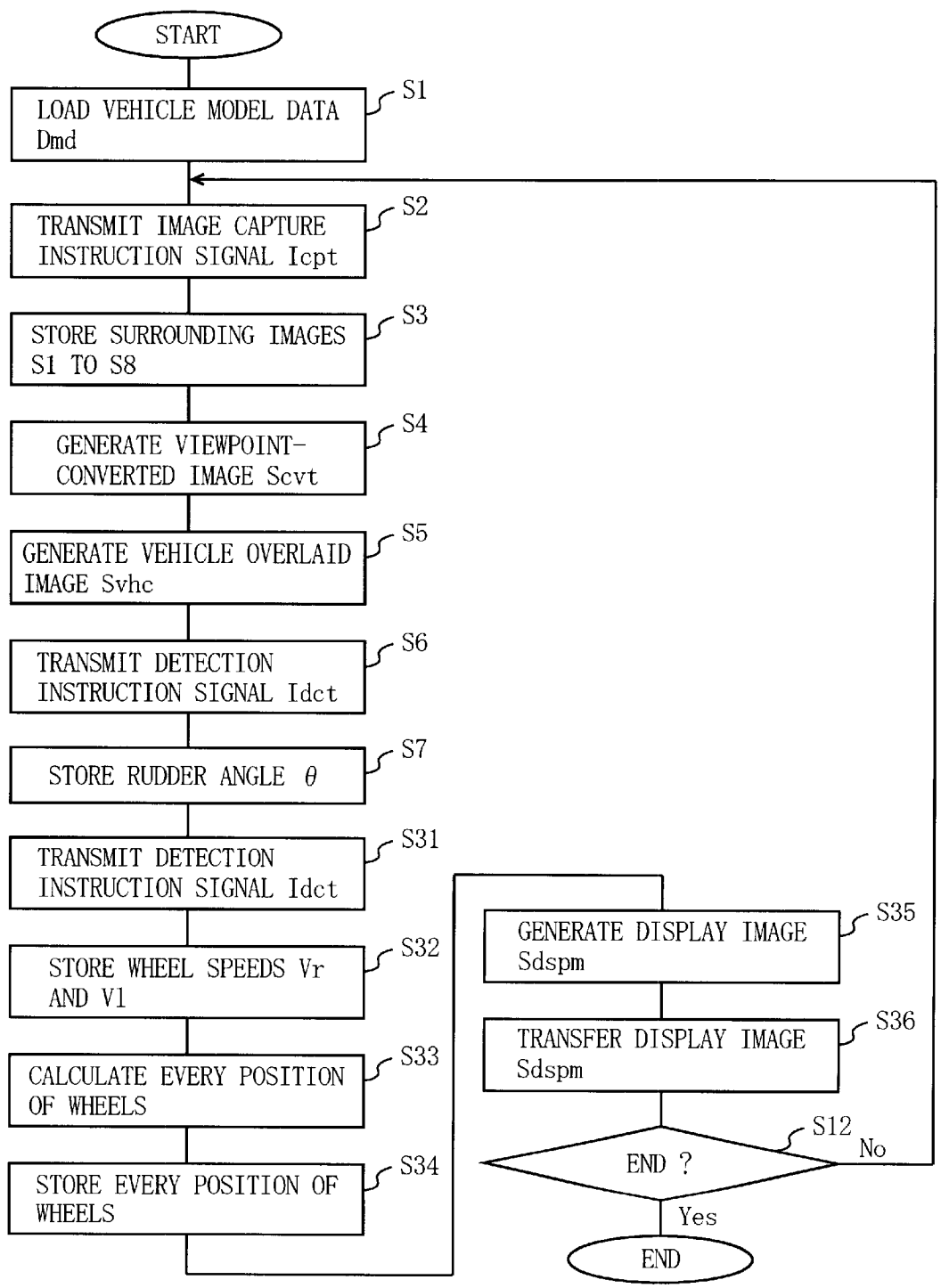
FIG. 16 is a flowchart showing a processing procedure described in a program PGc shown in FIG. 15.

Described next is the operation of the drive assistant device Uast3 in such structure. Similarly in the first embodiment, the processor 1 starts executing the program PGc responding to an instruction start signal Istr. FIG. 16 is a flowchart showing the processing procedure in the processor 1 described in the program PGc. Compared with FIG.

5, the flowchart of FIG. 16 includes steps S31 to S36 as alternatives to steps S8 to S11. This is the only difference therebetween, and thus any step that appears in FIG. 5 is under the same step number and not described again.

By the time when step S7 is through, the frame memory stores such vehicle overlaid image Svhc as shown in FIG. 6B, and the working area 3 stores the rudder angle θ. After step S7, the processor 1 generates a wheel speed detection instruction signal Iwdtc, and transmits the wheel speed detection instruction signal Iwdtc to both of the wheel speed sensors 32 and 33 (step S31). Here, the wheel speed detection instruction signal Iwdtc is a signal for instructing the wheel speed sensors 32 and 33 to detect the wheel speeds Vr and Vl. The wheel speed sensors 32 and 33 thus responsively detect the wheel speeds Vr and Vl, and store the detected wheel speeds Vr and Vl in the working area 3 (step S32).

Next, based on the rudder angle θ and the wheel speeds Vr and Vl, the processor 1 specifies each current position of the wheels of the vehicle Vusr (step S33). By referring to FIG. 17, the processing in step S33 is described in detail. FIG. 17 shows the four wheels of the vehicle Vusr (not shown) on the road surface Frd, that is, the front-right wheel Wf1, the front-left wheel Wf2, the rear-right wheel Wr1, and the rear-left wheel Wr2. FIG. 7 also shows a line segment Lr12 connecting a rotation center Pr1 of the rear-right wheel Wr1 and a rotation center Pr2 of the rear-left wheel Wr2. Also, the midpoint of the line segment Lr12 is Prc.

Assume that the midpoint Prc starts moving from a point Ct as the vehicle Vusr moves backward. Here, when the midpoint Prc is located on the point Ct, the positions of the rotation centers Pr1 and Pr2 are referred to as, respectively, an initial position Pr1t of the rear-right wheel Wr1 and an initial position Pr2t of the right-left wheel Wr2. Similarly, when the midpoint Prc is located at the point Ct, the positions of rotation centers Pf1 and Pf2 of the front-right wheel Wf1 and front-left wheel Wf2 are referred to as, respectively, an initial position Pf1t and an initial position Pf2t. When the midpoint Prc moves to a point Ct+1, the travelling quantity of the midpoint Prc (i.e., the distance from the point Ct to Ct+1) can be expressed by the following equation (13).

$$Drc = \int \frac{Vl + Vr}{2} dt = Rs \cdot \alpha \qquad (13)$$

In the above equation (13), Vr and Vl denote the wheel speeds of the rear-right wheel Wr1 and the rear-left wheel Wr2, respectively. Here, Rs is a radius of a circle traceable by the midpoint Prc as described by referring to FIG. 7. Further, α is a rotation angle of the midpoint Prc, and formed by a line segment Ct Ob and a line segment Ob Ct+1. Here, Ob is a center of the circle traceable by the midpoint Prc as described above.

As described above by referring to FIG. 7, under the Ackermann's model, the following equations (1) and (2) are established when the vehicle Vusr circles.

$$Rs = Dwb / \tan \beta \qquad (1)$$

$$\beta = \kappa \theta \qquad (2)$$

With these equations (1) and (2), α is expressed by the following equation (14).

$$\alpha = \frac{1}{Rs} \cdot \int \frac{Vl + Vr}{2} dt = \frac{\tan \beta}{Dwb} \cdot \int \frac{Vl + Vr}{2} dt \qquad (14)$$

Here, a 2D coordinate system Csc including axes of X and Y is defined. With the midpoint Prc located at the point Ct, the X-axis is set to direct toward the rotation center Pf1 of the front-right wheel Wf1, while the Y-axis toward the rotation center Pr2 from the same rotation center Pr1. In FIG. 17, the origin Oc of the 2D coordinate system Csc is found a little away from the rotation center Pr1. In the 2D coordinate system Csc, a vector Trc from the point Ct to Ct+1 is expressed by the following equation (15).

$$Trc = (Rs \cdot \sin \alpha, Rs \cdot (1 - \cos \alpha)) = \frac{Dwb}{\tan \beta}(\sin \alpha, 1 - \cos \alpha) \qquad (15)$$

With the above equations (2), (14), and (15), the rotation angle α and the vector Trc are expressed by the following equations (16) and (17).

$$\alpha = \frac{\tan \kappa \theta}{Dwb} \cdot \int \frac{Vl + Vr}{2} dt \qquad (16)$$

$$Trc = \frac{Dwb}{\tan \kappa \theta}(\sin \alpha, 1 - \cos \alpha) \qquad (17)$$

In the equations (16) and (17), the wheel speeds Vr and Vl, and the rudder angle θ are the only unknown values. It means substituting the rudder angle θ stored in step S7 and the wheel speeds Vr and Vl received in step S32 to the above equations (16) and (17) will find the rotation angle α and the vector Trc. Further, adding the vector Trc to the initial positions Pr1t and Pr2t will find a position Pr1(t+1) of the rear-right wheel Wr1 and a position Pr2(t+1) of the rear-left wheel Wr2 with the midpoint Prc located at the point Ct+1. Here, as those initial positions Pf1t and Pf2t are both away from the midpoint Prc by a fixed value, a position Pf1 (t+1) of the front-right wheel Wf1 and a position Pf2 (t+1) of the front-left wheel Wf2, with the midpoint Prc located at the point Ct+1, can be also calculated easily.

After the above processing, the processor 1 stores the resulting position Pr1 (t+1) of the rear-right wheel Wr1, the position Pr2 (t+1) of the rear-left wheel Wr2, the position Pf1 (t+1) of the front-right wheel Wf1, and the position Pf2 (t+1) of the front-left wheel Wf2 to the working area 3 (step S34). Note herein that, in FIG. 16, the procedure returns to step S2 from step S12 in some cases, and if so, step S34 is repeatedly carried out until the vehicle Vusr is parked. In step S34, those calculated positions of Pr1 (t+1), Pr2 (t+1), Pf1 (t+1), and Pf2 (t+1) are not deleted by those newly calculated, but stored form number of times (where m is a natural number being 1 or larger) in the working area 3.

Figure 18:
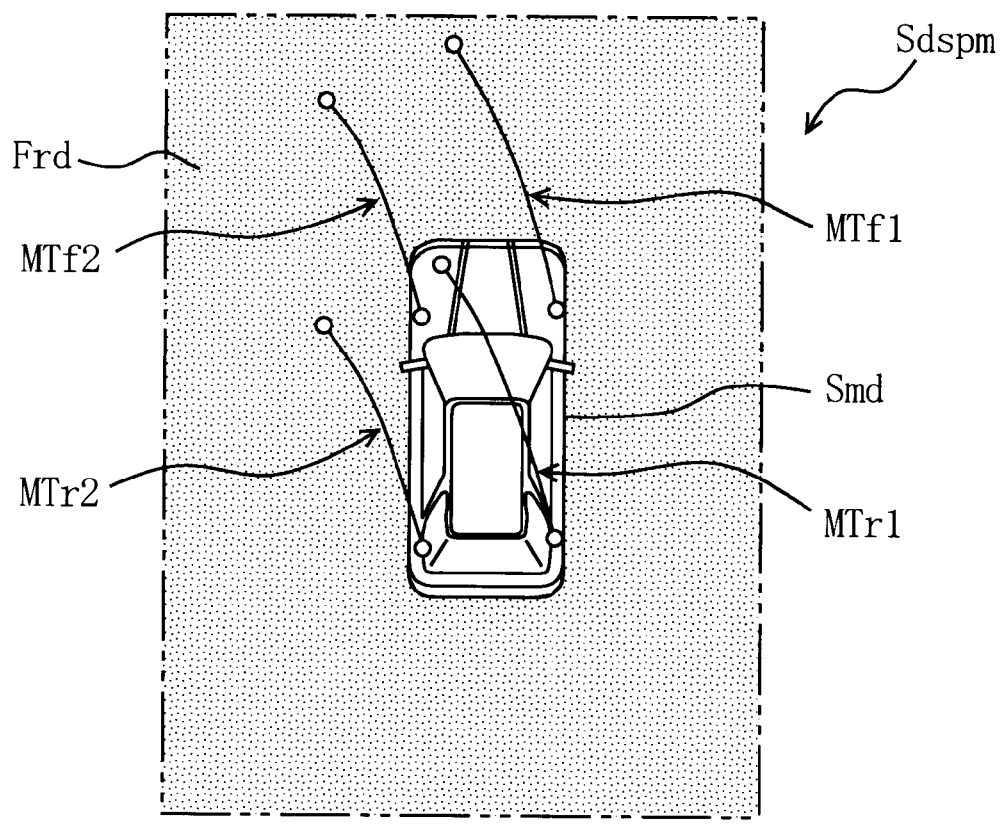
FIG. 18 is a diagram showing a display image Sdspm generated in step S35 of FIG. 16.

Next, the processor 1 renders, on the vehicle overlaid image Svhc on the frame memory, a trail MTr1 of the rear-right wheel Wr1, a trail MTr2 of the rear-left wheel Wr2, a trail MTf1 of the front-right wheel Wf1, and a trail MTf2 of the front-left wheel Wf2. The resulting image is a display image Sdspm as shown in FIG. 18 (step S35). To be more specific, the processor 1 connects m points of Pr1(t+1) in the working area 3 so that the trail MTr1 is generated. The trail MTr1 shows previous movement of the rear-right wheel Wr1 of the vehicle Vusr on the road surface Frd. The processor 1 then renders, in the scaling factor Fscl, the generated trail MTr1 from the rear-right wheel part of the vehicle model image Smd to the inverse direction of the heading direction of the vehicle Vusr. In a similar manner, the processor 1 renders the trails MTr2, MTf1, and MTf2. FIG. 18 shows, for convenience, the trails MTr1, MTr2, MTf1, and MTf2 extending from the wheel positions of the vehicle model image Smd. Actually, with hidden surface removal, the trails MTr1, MTr2, MTf1, and MTf2 in the display image Sdspm are so rendered as to extend from the front end of the vehicle model image Smd.

The processor 1 then transfers the display image Sdspm on the frame memory to the display device 14 for display thereon (step S36). When parking, especially parallel parking, the driver may have a hard time to park the vehicle Vusr if the initial position thereof is not appropriate. In this embodiment, with the display image Sdspm on the display, the driver can see which trails so far tried but failed. Therefore, the driver can recognize which initial position so far failed him/her, and he/she can try more appropriate initial position to park the vehicle Vusr.

Then, the processor 1 determines whether now is the time to end the processing of FIG. 16 (step S12). If the processor 1 determines that the vehicle Vusr is now parked, this is the end of the processing of FIG. 16. If not yet, the procedure returns to step S2 to generate another display image Sdspm.

In the present embodiment, the wheel speed sensors 32 and 33 are incorporated in the drive assistant device Uast3 to produce the trails MTr1, MTr2, MTf1, and MTf2. Herein, any type of sensor will do as long as detecting the speed of the vehicle Vusr.

In the above embodiments, the programs PGa to PGc are stored in the rendering devices Urnd1 to Urnd3, respectively. This is not restrictive, and those programs PGa to PGc may be distributed in a recording medium typified by CD-ROM, or over a communications network such as the Internet.

While the invention has been described in detail, the foregoing description is in all aspects illustrative and not restrictive. It is understood that numerous other modifications and variations can be devised without departing from the scope of the invention.

What is claimed is:

1. A rendering device for use with a vehicle and for generating a display image for drive assistance, said rendering device comprising:
   a first generation part operable to generate a surrounding image corresponding to an area surrounding the vehicle;
   a rudder angle sensor to be placed in the vehicle;
   a reception part operable to receive a current rudder angle from said rudder angle sensor;
   a calculation part operable to calculate, based on the rudder angle received by said reception part, a three-dimensional predictive trajectory of the vehicle; and
   a second generation part operable to generate a display image showing the three-dimensional predictive trajectory calculated by said calculation part rendered on the surrounding image generated by said first generation part.

2. The rendering device according to claim 1, wherein said calculation part is operable to calculate the three-dimensional predictive trajectory with reference to a wheel position of the vehicle.

3. The rendering device according to claim 1, wherein said calculation part is operable to calculate the three-dimensional predictive trajectory with reference to a point on a surface of the vehicle farthest from a longitudinal median plane of the vehicle.

4. The rendering device according to claim 1, wherein the vehicle has a back, and when the vehicle is moving backward, said calculation part is operable to calculate the three-dimensional predictive trajectory extending toward the back of the vehicle.

5. The rendering device according to claim 1, wherein the vehicle has a front, and when the vehicle is moving forward, said calculation part is operable to calculate the three-dimensional predictive trajectory extending toward the front of the vehicle.

6. The rendering device according to claim 1, wherein said calculation part is operable to calculate, by referring to the rudder angle received from said rudder angle sensor, the three-dimensional predictive trajectory with reference to a corner of the vehicle that is on an opposite side to the rudder angle and that is on the rear side of the vehicle with respect to a heading direction.

7. The rendering device according to claim 1, wherein the vehicle includes a gear sensor that detects a current gear of the vehicle, said rendering device further comprising:
   a determination part for determining whether the vehicle is moving forward or backward based on the gear detected by the gear sensor of the vehicle,
   wherein said calculation part is operable to calculate, when said determination part determines that the vehicle is moving forward, the three-dimensional predictive trajectory extending in a forward direction, and to calculate, when said determination part determines that the vehicle is moving backward, the tree-dimensional predictive trajectory extending in a backward direction.

8. The rendering device according to claim 1, further comprising:
   a gear sensor, to be located in the vehicle, operable to detect a current gear of the vehicle; and
   a determination part for determining whether the vehicle is moving forward or backward based on the gear detected by said gear sensor,
   wherein said calculation part is operable to calculate, when said determination part determines that the vehicle is moving forward, the three-dimensional predictive trajectory extending in a forward direction, and to calculate, when said determination part determines that the vehicle is moving backward, the tree-dimensional predictive trajectory extending in a backward direction.

9. The rendering device according to claim 1, wherein said calculation part comprises:
   sampling means for projecting at least one point along a first predictive trajectory; and
   projection means for projecting the at least one point onto the surrounding image from a predetermined viewpoint,
   wherein said calculation part is operable to calculate a second predictive trajectory based on the rudder angle received by said reception part and add a predetermined height value to the second predictive trajectory to obtain the first predictive trajectory.

10. A vehicle comprising:
   a first generation part operable to generate a surrounding image corresponding to an area surrounding said vehicle;
   a rudder angle sensor;

a reception part operable to receive a current rudder angle from said rudder angle sensor;

a calculation part operable to calculate, based on the rudder angle received by said reception part, a three-dimensional predictive trajectory of said vehicle; and a second generation part operable to generate a display image showing the three-dimensional predictive trajectory calculated by said calculation part rendered on the surrounding image generated by said first generation part.

11. The vehicle according to claim 10, wherein said calculation part is operable to calculate the three-dimensional predictive trajectory with reference to a wheel position of said vehicle.

12. The vehicle according to claim 10, wherein said calculation part is operable to calculate the three-dimensional predictive trajectory with reference to a point on a surface of said vehicle farthest from a longitudinal median plane of said vehicle.

13. The vehicle according to claim 10, wherein said vehicle has a back, and when said vehicle is moving backward, said calculation part is operable to calculate the three-dimensional predictive trajectory extending toward said back of said vehicle.

14. The vehicle according to claim 10, wherein said vehicle has a front, and when said vehicle is moving forward, said calculation part is operable to calculate the three-dimensional predictive trajectory extending toward said front of said vehicle.

15. The rendering device according to claim 10, wherein said calculation part is operable to calculate, by referring to the rudder angle received from said rudder angle sensor, the three-dimensional predictive trajectory with reference to a corner of said vehicle that is on an opposite side to the rudder angle and that is on the rear side of said vehicle with respect to a heading direction.

16. The vehicle according to claim 10, further comprising:

a gear sensor operable to detect a current gear of said vehicle; and a determination part for determining whether said vehicle is moving forward or backward based on the gear detected by said gear sensor, wherein said calculation part is operable to calculate, when said determination part determines that said vehicle is moving forward, the three-dimensional predictive trajectory extending in a forward direction, and to calculate, when said determination part determines that said vehicle is moving backward, the three-dimensional predictive trajectory extending in a backward direction.

17. The rendering device according to claim 10, wherein said calculation part comprises:

sampling means for projecting at least one point along a first predictive trajectory; and projection means for projecting the at least one point onto the surrounding image from a predetermined viewpoint, wherein said calculation part is operable to calculate a second predictive trajectory based on the rudder angle received by said reception part and add a predetermined height value to the second predictive trajectory to obtain the first predictive trajectory.

18. A rendering device for use with a vehicle and for generating a display image for drive assistance, said rendering device comprising:

a first generation part operable to generate a surrounding image corresponding to an area surrounding the vehicle;

a calculation part operable to calculate a trail indicative of the vehicle's previous movement; and a second generation part operable to generate a display image showing the trail calculated by said calculation part rendered on the surrounding image generated by said first generation part.

19. The rendering device according to claim 18, wherein the vehicle includes one or more wheels, a rudder angle sensor, and a wheel speed sensor, said rendering device further comprising:

a first reception part operable to receive a current rudder angle of the vehicle from the rudder angle sensor of the vehicle; and a second reception part operable to receive a wheel speed of each wheel from the wheel speed sensor of the vehicle, wherein said calculation part is operable to calculate the trail of the vehicle based on the rudder angle received by said first reception part and the wheel speeds received by said second reception part.

20. The rendering device according to claim 18, wherein the vehicle includes one or more wheels, said rendering device further comprising:

a rudder angle sensor to be placed in the vehicle;

a wheel speed sensor;

a first reception part operable to receive a current rudder angle of the vehicle from said rudder angle sensor; and a second reception part operable to receive a wheel speed of each wheel of the vehicle from said wheel speed sensor, wherein said calculation part is operable to calculate the trail of the vehicle based on the rudder angle received by said first reception part and the wheel speeds received by said second reception part.

21. A rendering method for use with a vehicle having a rudder angle sensor and for generating a display image for drive assistance, said method comprising:

generating a surrounding image corresponding to an area surrounding the vehicle;

receiving a current rudder angle from the rudder angle sensor of the vehicle;

calculating a three-dimensional predictive trajectory of the vehicle based on the received rudder angle; and generating a display image showing the calculated three-dimensional predictive trajectory rendered on the generated surrounding image.

22. A rendering method for use with a vehicle and for generating a display image for drive assistance, said method comprising:

generating a surrounding image corresponding to an area surrounding the vehicle;

calculating a trail indicative of the vehicle's previous movement; and generating a display image showing the calculated trail rendered on the received surrounding image.

23. A machine readable medium on which a program for generating a display image for drive assistance is recorded, said recording medium being for use with a vehicle having a rudder angle sensor, said program comprising:

generating a surrounding image corresponding to an area surrounding the vehicle;

receiving a current rudder angle from the rudder angle sensor of the vehicle;

calculating a three-dimensional predictive trajectory of the vehicle based on the received rudder angle; and generating a display image showing the calculated three-dimensional predictive trajectory rendered on the generated surrounding image.

24. A recording medium on which a program for generating a display image for drive assistance is stored, said recording medium being for use with a vehicle, said program comprising:

generating a surrounding image corresponding to an area surrounding the vehicle;

calculating a trail indicative of the vehicle's previous movement; and generating a display image showing the calculated trail rendered on the generated surrounding image.

25. A program for generating a display image for drive assistance, said program being for use with a rendering device including a processor for executing said program, and being for use with a vehicle having a rudder angle sensor, said program comprising:

generating a surrounding image corresponding to an area surrounding the vehicle;

receiving a current rudder angle from the rudder angle sensor of the vehicle;

calculating a three-dimensional predictive trajectory of the vehicle based on the received rudder angle; and generating a display image showing the calculated three-dimensional predictive trajectory rendered on the generated surrounding image.

26. A program for generating a display image for drive assistance, said program being for use with a vehicle and a rendering device including a processor for executing said program, said program comprising:

generating a surrounding image corresponding to an area surrounding the vehicle;

calculating a trail indicative of the vehicle's previous movement; and generating a display image showing the calculated trail rendered on the received surrounding image.

* * * * *

UNITED STATES PATENT AND TRADEMARK OFFICE
CERTIFICATE OF CORRECTION

PATENT NO. : 6,539,288 B2
DATED : March 25, 2003
INVENTOR(S) : Akira Ishida et al.

It is certified that error appears in the above-identified patent and that said Letters Patent is hereby corrected as shown below:

<u>Column 16,</u>
Lines 31-32 and 46-47, please replace "tree-dimensional" with -- three-dimensional --.

<u>Column 17,</u>
Lines 48-49, please replace "tree-dimensional" with -- three-dimensional --.

Signed and Sealed this

Twenty-third Day of December, 2003

JAMES E. ROGAN
*Director of the United States Patent and Trademark Office*